US012584812B2

(12) United States Patent
Zorzetto et al.

(10) Patent No.: US 12,584,812 B2
(45) Date of Patent: Mar. 24, 2026

(54) PRESSURE-SENSOR ASSEMBLY, AND CORRESPONDING DEVICE AND INSERT

(71) Applicant: ELTEK S.p.A., Casale Monferrato (IT)

(72) Inventors: Mauro Zorzetto, Casale Monferrato (IT); Marco Bigliati, Casale Monferrato (IT)

(73) Assignee: ELTEK S.p.A, Casale Monferrato (IT)

( * ) Notice: Subject to any disclaimer, the term of this patent is extended or adjusted under 35 U.S.C. 154(b) by 838 days.

(21) Appl. No.: 17/910,780

(22) PCT Filed: Mar. 11, 2021

(86) PCT No.: PCT/IB2021/052046
§ 371 (c)(1),
(2) Date: Sep. 9, 2022

(87) PCT Pub. No.: WO2021/181332
PCT Pub. Date: Sep. 16, 2021

(65) Prior Publication Data
US 2023/0118332 A1 Apr. 20, 2023

(30) Foreign Application Priority Data
Mar. 12, 2020 (IT) ......................... 102020000005389

(51) Int. Cl.
*G01L 19/06* (2006.01)
*G01L 9/00* (2006.01)
(Continued)

(52) U.S. Cl.
CPC ............ *G01L 19/06* (2013.01); *G01L 9/0051* (2013.01)

(58) Field of Classification Search
CPC ..... G01L 19/06; G01L 9/0051; G01L 19/144; G01L 19/0618
See application file for complete search history.

(56) References Cited

U.S. PATENT DOCUMENTS

| | | | |
|---|---|---|---|
| 5,792,958 A | 8/1998 | Speldrich | |
| 2010/0011871 A1* | 1/2010 | Bigliati ................. | G01L 9/0052 73/756 |

(Continued)

FOREIGN PATENT DOCUMENTS

| | | |
|---|---|---|
| CN | 102239395 A | 11/2011 |
| CN | 204789130 U | 11/2015 |

(Continued)

OTHER PUBLICATIONS

International Search Report dated Jun. 15, 2021, for PCT/IB2021/052046, 3 pp.

(Continued)

*Primary Examiner* — Alexander A Mercado
*Assistant Examiner* — Anthony W Megna Fuentes
(74) *Attorney, Agent, or Firm* — Nixon & Vanderhye P.C.; Lars H. Genieser

(57) ABSTRACT

A pressure-sensor assembly (1) for detecting the pressure of a fluid comprises: —a pressure-sensitive component (2), having a generally cup-shaped sensor body (5), which includes a bottom portion (5a) and a peripheral portion (5b) that define an axial cavity ($C_1$, $C_2$), the bottom portion (5a) including an elastically deformable membrane part, which closes the axial cavity ($C_1$, $C_2$) at one end of the sensor body (5), and the peripheral portion (5b) having a distal edge opposite to the bottom portion (5a), which delimits an inlet of the axial cavity ($C_1$, $C_2$), the bottom portion (5a) having associated thereto at least one element for detecting deformation of the membrane part; and —a compensation element (3), configured for compensating possible variations of volume of the fluid, comprising at least one compensation body (8), made of a first elastically deformable or compressible material, and a core (9) fixed on which is the at least one compensation body (8), the core (9) being made of a second (Continued)

material stiffer than the first material. The sensor body (5) and the compensation element (3) are configured as distinct parts, and at least one first portion (8*b*, 8*c*) of the compensation element (3) is configured for coupling with elastic interference on the sensor body (5), in such a way that the pressure-sensitive component (2) and the compensation element (3) can be handled as a single unit.

16 Claims, 28 Drawing Sheets

(51) Int. Cl.
  G01L 19/14          (2006.01)
  G01L 19/00          (2006.01)

(56)                References Cited

U.S. PATENT DOCUMENTS

2012/0017689  A1      1/2012  Giordano et al.
2017/0350778  A1     12/2017  Gadini et al.
2018/0319271  A1 *   11/2018  Barbano ............... F01N 3/2066
2019/0094095  A1      3/2019  Martinengo
2020/0333208  A1     10/2020  Martinengo

FOREIGN PATENT DOCUMENTS

CN        109196324  B        1/2021
CN        107250752  B        3/2021
JP        S61-246642          11/1986
JP        S61246642  A  *     11/1986  ............. G01L 19/00
JP        H07-294354          11/1995
JP        2019515263 A        6/2019
WO        98/31997            7/1998
WO        2010065822 A1       6/2010
WO        2016103171 A1       6/2016
WO        2017/077448         5/2017
WO        2017182959 A1      10/2017
WO        2017182962 A1      10/2017

OTHER PUBLICATIONS

Written Opinion of the ISA dated Jun. 15, 2021, for PCT/IB2021/052046, 10 pp.

* cited by examiner

Fig. 14
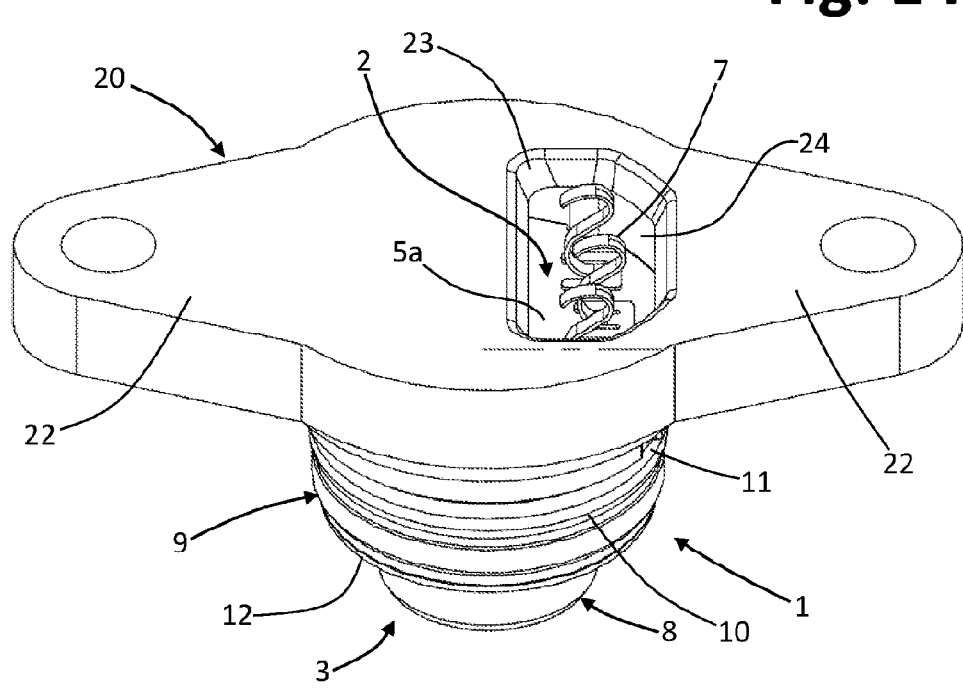
Fig. 15
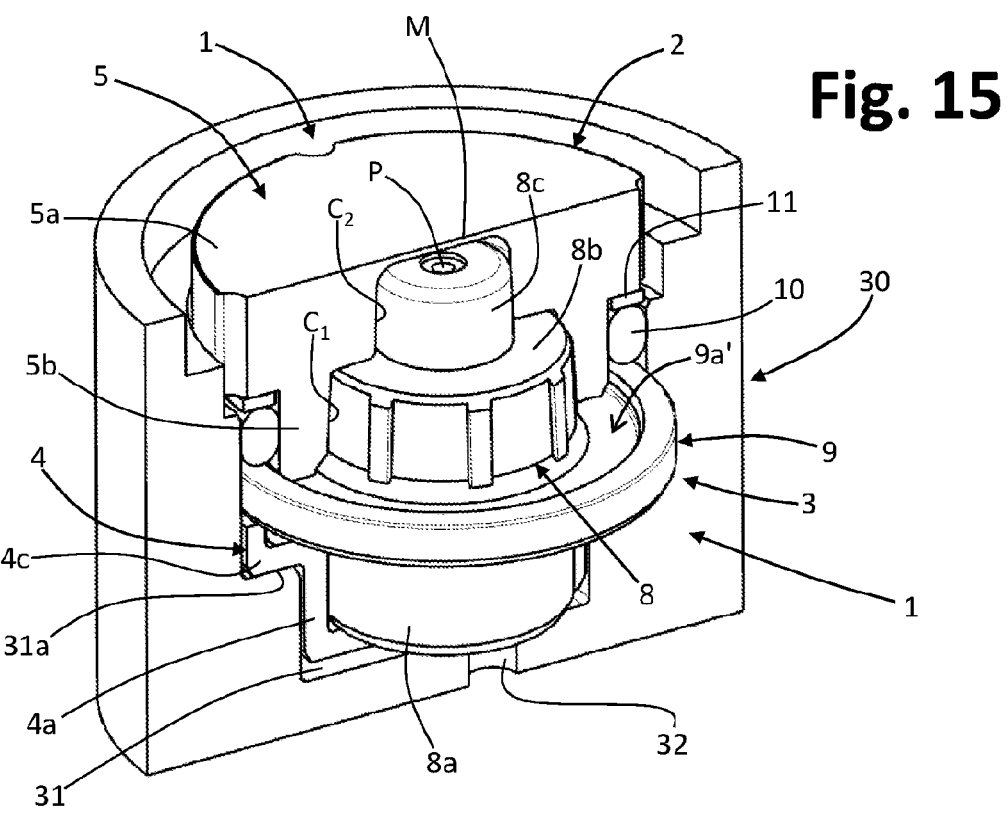

Fig. 26
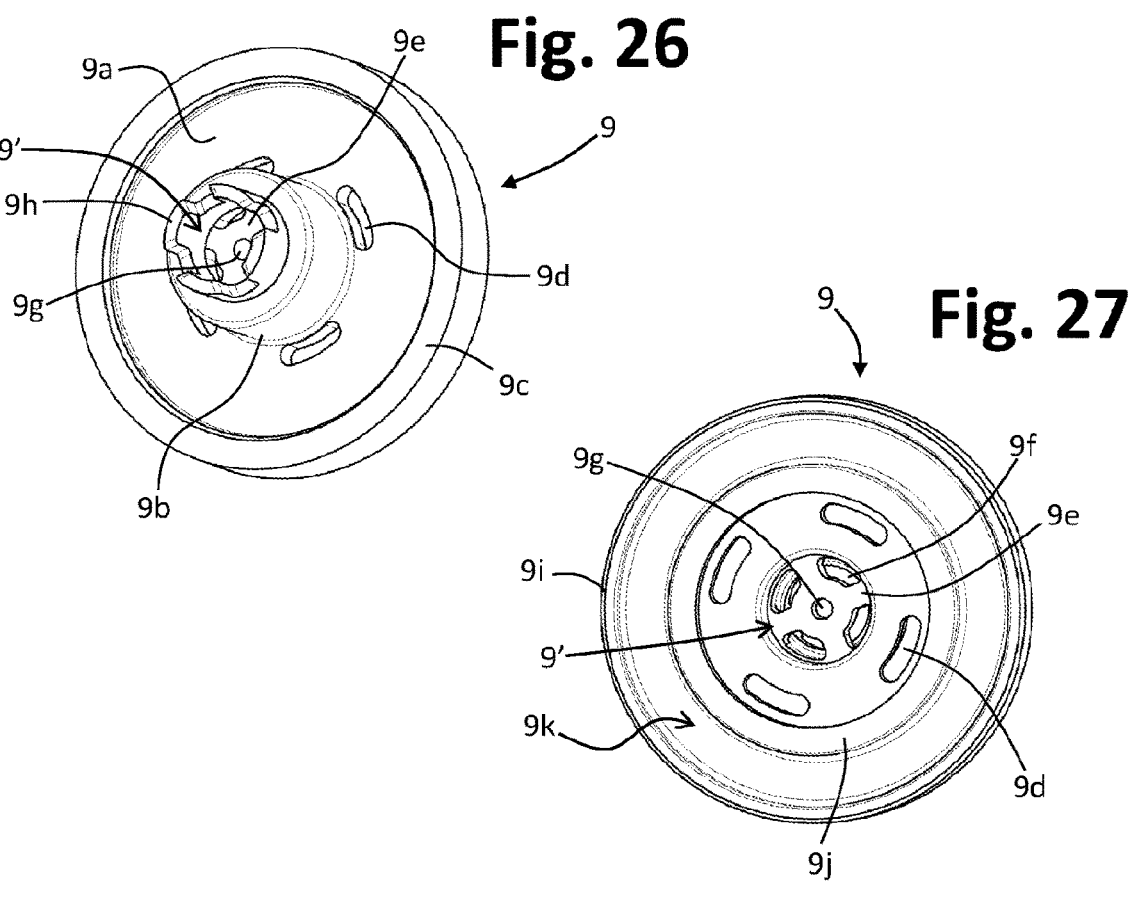
Fig. 27
Fig. 28
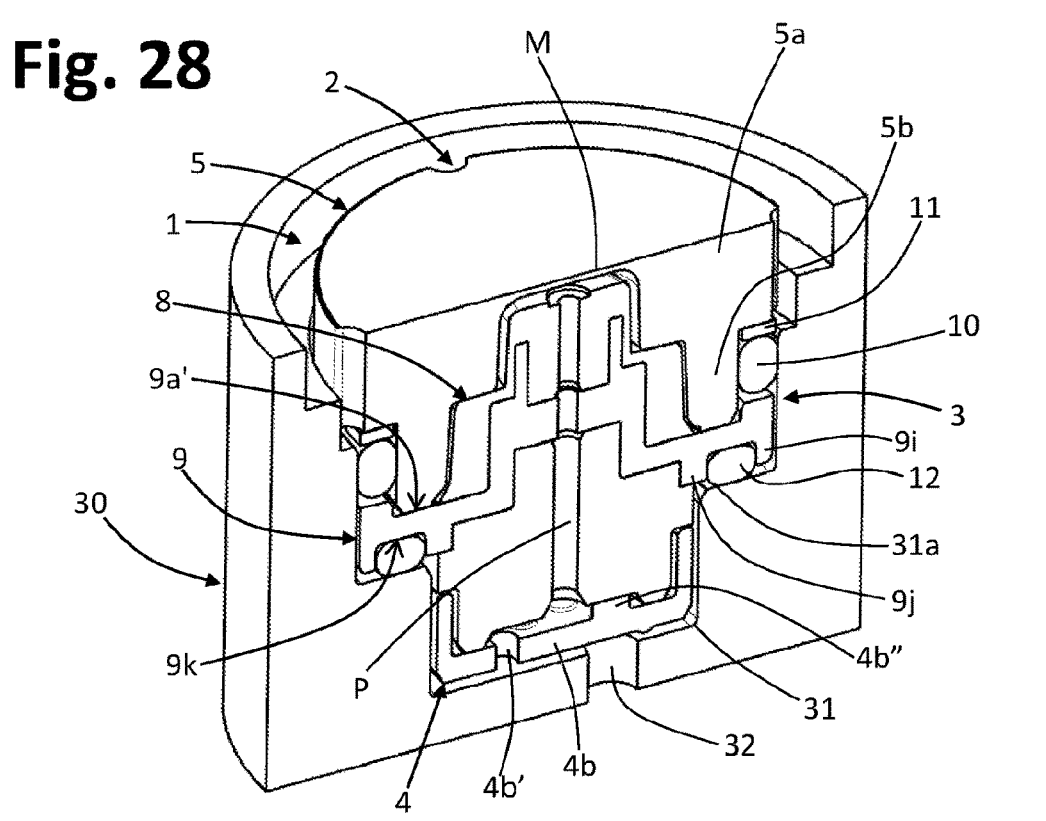

Fig. 43
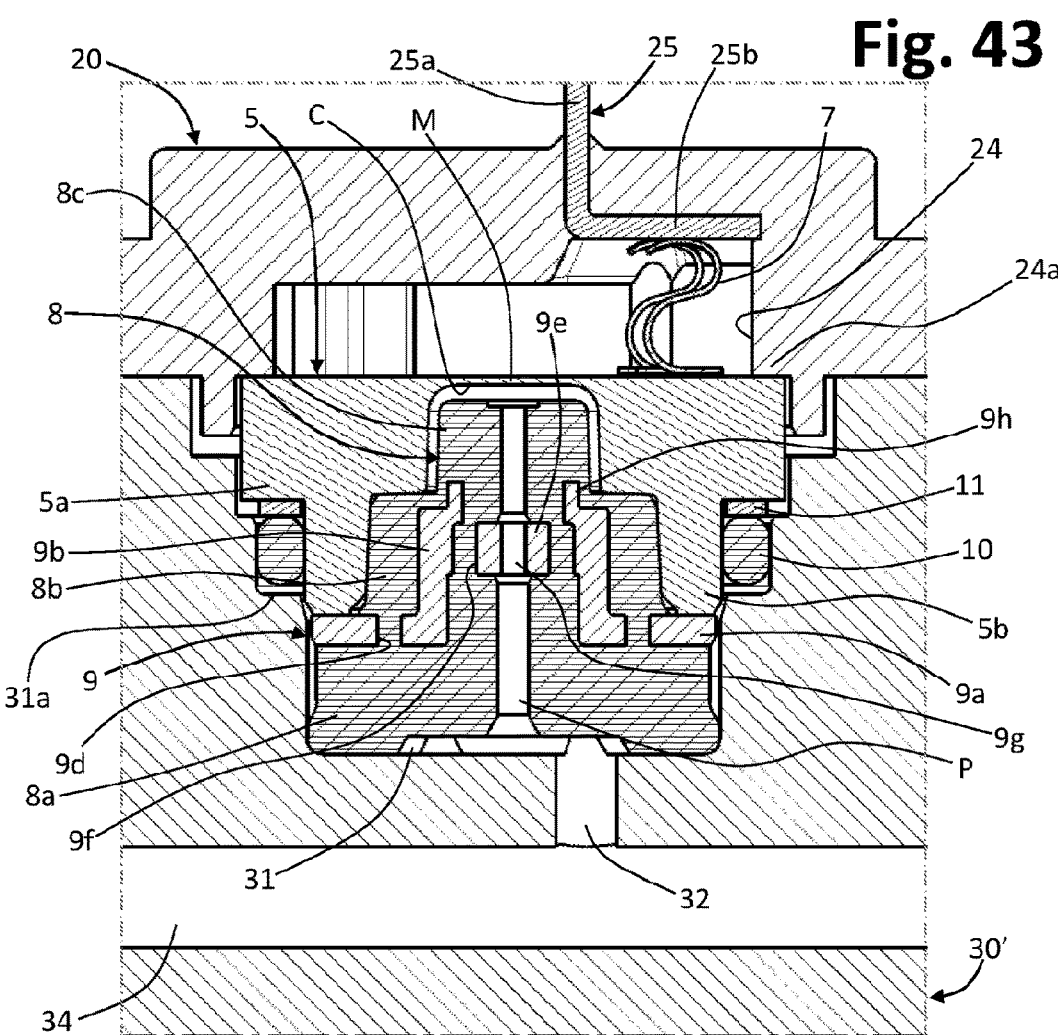
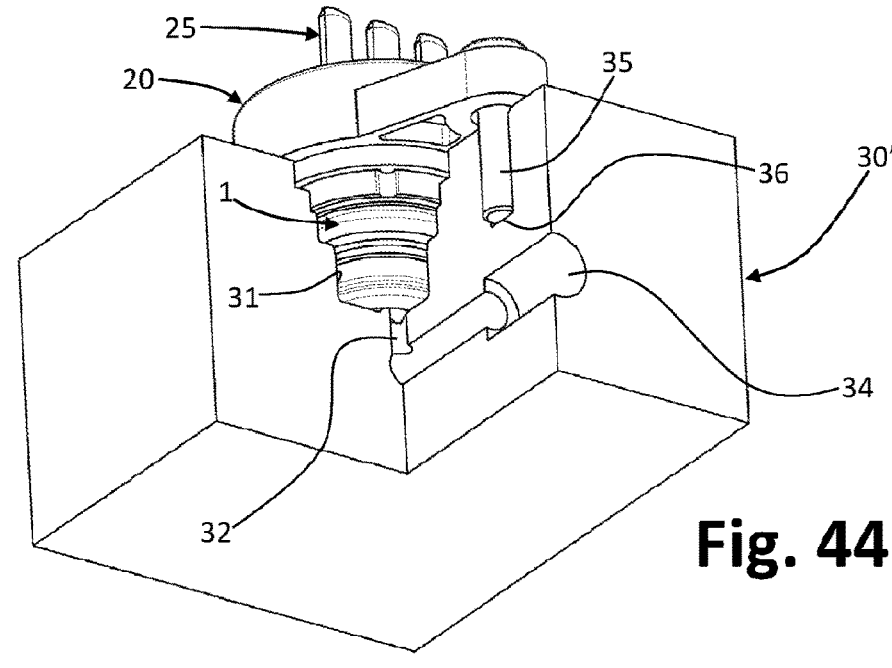
Fig. 44

PRESSURE-SENSOR ASSEMBLY, AND CORRESPONDING DEVICE AND INSERT

CROSS-REFERENCE TO RELATED APPLICATION(S)

This application is the U.S. national phase of International Application No. PCT/IB2021/052046 filed Mar. 11, 2021, which designated the U.S. and claims priority to IT 102020000005389 filed Mar. 12, 2020, the entire contents of each of which are hereby incorporated by reference.

DESCRIPTION

Field of the Invention

The present invention relates to sensor devices for detecting the pressure of a fluid. The invention has been developed with particular reference to self-standing sensor assemblies for such devices, which comprise at least one pressure-sensitive element and one element for compensation of any possible increase in volume of the fluid. The invention finds preferred application in the field of self-standing sensors or sensor assemblies for use on vehicles, in particular in hydraulic apparatuses and systems for vehicles.

Prior Art

From WO2008/078184 A2, filed in the name of the present Applicant, a pressure-sensor device is known, which comprises a pressure-sensitive component, having a substantially cup-shaped sensor body, i.e., having a blind cavity the bottom of which is formed by a membrane part. The membrane part is elastically deformable, and associated thereto is a detection element, such as a bridge of resistive or piezoresistive elements. The device likewise comprises a casing, including a supporting body defining a duct, through which the fluid the pressure of which is to be detected can reach the cavity of the sensor body and bring about possible elastic deformation of the corresponding membrane part.

In some applications, the devices of the type referred to are designed to operate even in conditions of very low temperature. For this reason, it may occasionally happen that the fluid present within the device freezes, thus increasing in volume: given that the membrane part of the sensor body is usually relatively thin and delicate, it is important to adopt solutions that will prevent its failure of and/or damage to the corresponding detection element following upon the increase in volume of the fluid due to freezing.

The aforementioned prior document consequently proposes associating to the supporting body of the device one or more compressible compensation elements, suitable for compensating any possible increase in volume of the fluid following upon freezing thereof, with each of such elements that may possibly define a portion of the aforesaid duct for the fluid. In some versions described, such a compensation element is mounted on the outside of the supporting body, substantially at the cavity of the sensor body so as to project thereinto. In some embodiments, the compensation element is fixed in position on the supporting body by exploiting a tubular positioning insert, made of relatively stiff material, which is partially inserted—for example via screwing—into the outlet of the duct that delivers the fluid towards the membrane part (see, for example, FIG. 15-20 or 24 of the aforementioned prior document). In other embodiments, the compensation element is positioned on an insert, which is in turn held in position by a bottom arrest element, the insert and the arrest element being engaged in the aforementioned duct through its inlet end (see, for example, FIGS. 21-23 of the aforementioned document).

The sensor devices proposed in the aforementioned prior document are on average efficient from a functional standpoint, but present some drawbacks in terms of times and costs of production and installation of the corresponding compensation elements that it would be desirable to reduce. Installation of the compensation elements moreover presupposes a relatively complex construction of the supporting body so as to define a duct into which the insert of a compensation element is designed to be fitted, with a dedicated operation.

From WO 2016/103171 A1, filed in the name of the present Applicant, there is also known a sensor assembly that comprises a pressure-sensitive component, which also has a substantially cup-shaped sensor body, directly over-moulded on which is a body made of elastically compressible material that performs functions of compensation element, and possibly functions of scaling element and/or elastic supporting element. In some embodiments described (see, for example, FIGS. 37-39 of the aforementioned prior document), the aforesaid compressible body is overmoulded on the sensor body within the blind cavity of the corresponding cup-shaped body. The above solutions according to WO 2016/103171 A1 prove advantageous in the production stage, in so far as they enable a self-standing or independent sensor assembly to be obtained, i.e., a sensor assembly that, albeit including both a pressure-sensitive element and a compensation element, can be handled as a single unit. Production of such assemblies is, however, relatively complicated and costly, in terms of industrial process and manufacturing machinery, in view of the need to overmould in a safe and precise way the compliant material that is to form the compressible body within the cavity of the sensor body.

SUMMARY OF THE INVENTION

In its general terms, the present invention is aimed at providing a pressure sensor, or a pressure-sensor assembly, in particular of a self-standing or independent type, that is simpler and less expensive to produce than those of the prior art. A related aim of the invention is to provide pressure-sensor devices and compensation elements that can be advantageously used with the aforesaid sensor assemblies.

One or more of the above aims are achieved, according to the present invention, by a pressure-sensor assembly, a pressure-sensor device, and a compensation element that present the characteristics referred to in the annexed claims, which form an integral part of the teaching provided herein in relation to the invention.

BRIEF DESCRIPTION OF THE DRAWINGS

Further purposes, characteristics, and advantages of the invention will emerge clearly from the ensuing detailed description, which is provided with reference to the annexed schematic drawings, wherein:

FIGS. 13 and 14 are perspective views from different angles of a pressure-sensor device, comprising a sensor assembly and a casing part of a first type, according to possible embodiments;

FIGS. 15 and 16 are sectioned perspective views, from different angles, of a pressure-sensor device, comprising a sensor assembly and a casing part of a second type, according to possible embodiments;

FIGS. 26 and 27 are perspective views from different angles of a core or reinforcement of a compensation element of the type illustrated in FIG. 25;

FIGS. 28 and 29 are sectioned perspective views of a pressure-sensor device comprising a sensor assembly of the type illustrated in FIGS. 19-20 and a casing part according to possible embodiments;

FIGS. 40 and 41 are sectioned perspective views of a sensor assembly according to possible variant embodiments;

FIGS. 42 and 43 are partial cross-sectional views, according to mutually orthogonal planes, of a pressure-sensor device, comprising a sensor assembly of the type illustrated in FIGS. 40-41, and a casing part, according to possible embodiments, mounted on a generic functional component;

FIGS. 44 and 45 are a sectioned perspective view and an exploded view, respectively, of the device and of the component of FIG. 43;

FIG. 46 is a perspective view of a compensation element of a sensor assembly according to possible embodiments;

FIG. 47 is a perspective view of a core or reinforcement that can be used in a compensation element of the type illustrated in FIG. 46;

DESCRIPTION OF EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment" and the like that may be present in various points of this description do not necessarily refer to one and the same embodiment, but may instead refer to different embodiments. Moreover, particular conformations, structures or characteristics defined in the framework of the present description may be combined in any adequate way in one or more embodiments, even different from the ones represented. The reference numbers and spatial references (such as "upper", "lower", "top", "bottom", etc.) are here used merely for convenience and hence do not limit the sphere of protection or the scope of the embodiments. In the present description and in the attached claims, the generic term "material" is to be understood as comprising mixtures, compositions, or combinations of a number of different materials (for example, multilayer structures or composite materials). In the figures, the same reference numbers are used to designate elements that are similar or technically equivalent to one another.

Figures 1, 2:
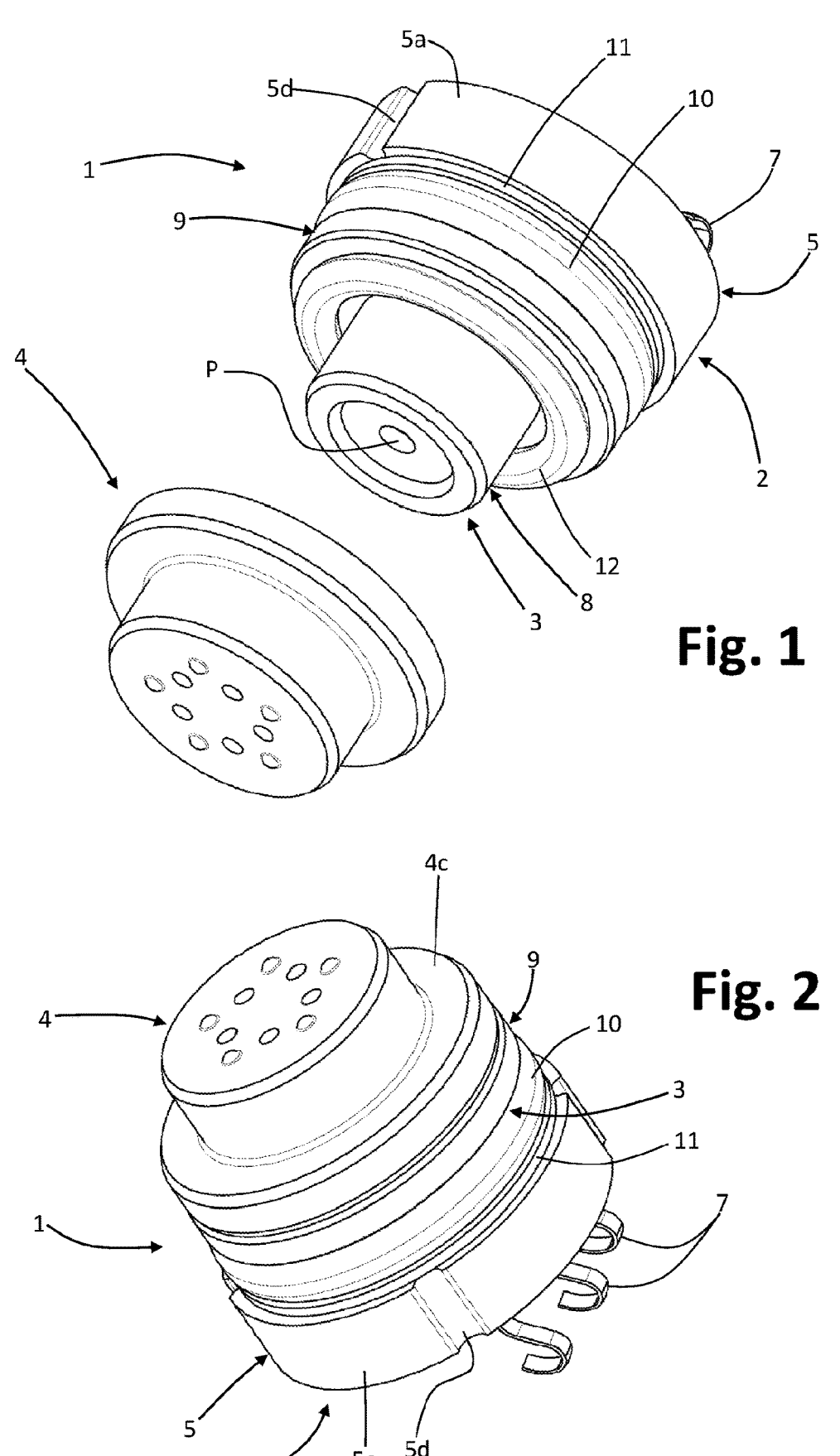
FIG. 1 is a perspective view of a pressure-sensor assembly according to possible embodiments, with an optional shielding element.
FIG. 2 is a perspective view of the assembly of FIG. 1, with the aforementioned shielding element coupled thereto.

Represented schematically in FIGS. 1 and 2 is a sensor assembly for a pressure-sensor device according to possible embodiments. The assembly, designated as a whole by 1, comprises a pressure-sensitive component 2, referred to hereinafter and identified for simplicity also as "pressure sensor" or "sensor", and a compensation element 3, made at least in part of an elastically compressible or deformable material to enable compensation of a possible increase in volume of a fluid being detected, as explained in the introductory part of the present description. In the example illustrated, the assembly 1 further includes a shielding element, designated by 4, which constitutes, however, an optional and non-essential component of a sensor assembly according to the invention.

Figures 3, 4:
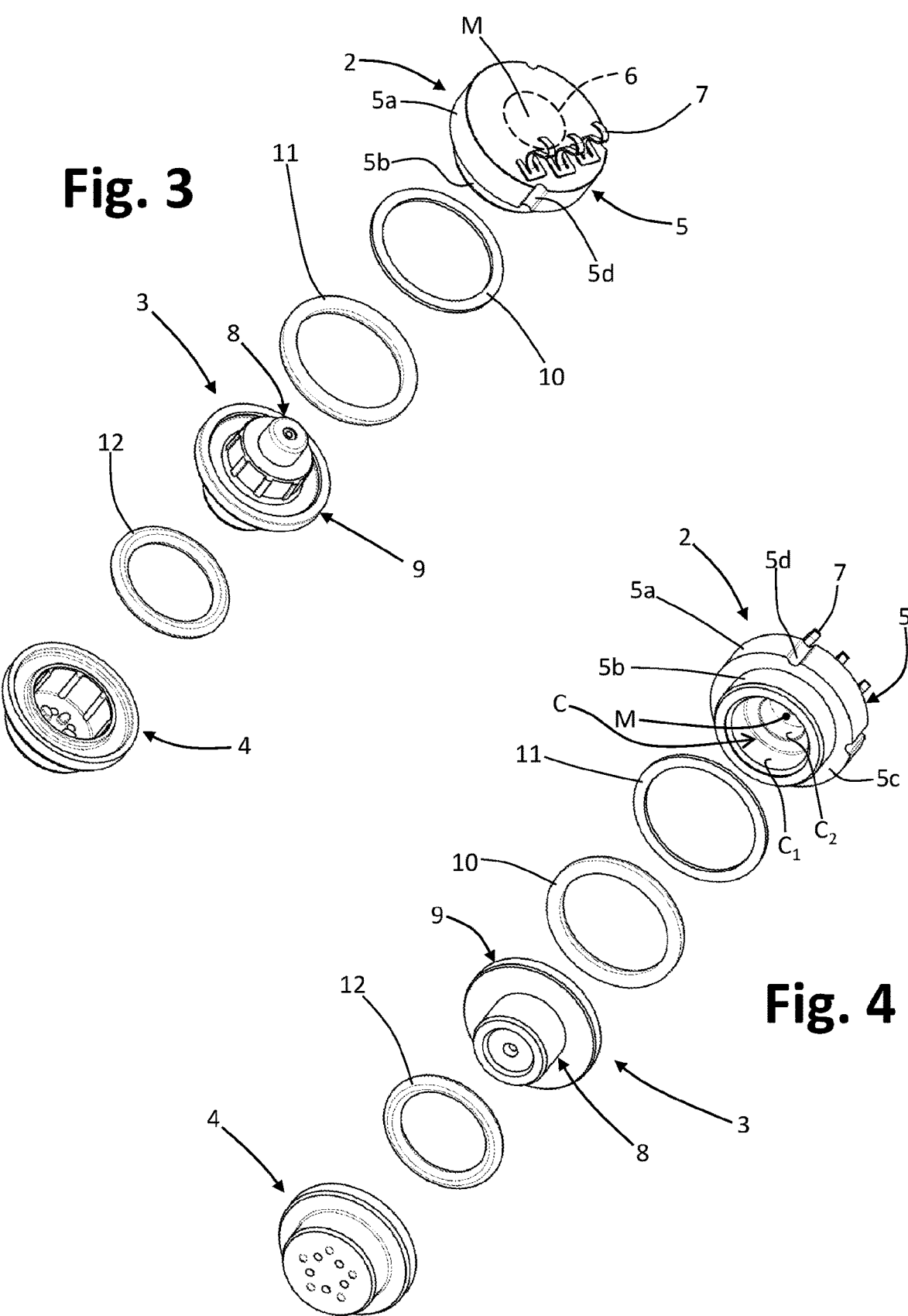
FIGS. 3 and 4 are exploded views from different angles of a sensor assembly of the type illustrated in FIGS. 1-2.

With reference also to FIGS. 3 and 4, in various embodiments, the sensor 2 comprises a sensor body 5, for example made of ceramic material, including a membrane part M, which is elastically deformable as a function of the pressure of the fluid to be measured. In what follows, for simplicity the part M will also be defined simply as "membrane". The membrane M may be obtained integrally in the sensor body 5 or else be configured as a distinct part associated at one end of a generally tubular body, for example via welding or gluing, in order to define therein a blind cavity, i.e., a cavity closed at one end.

As per the known technique, the sensor 2 has associated to it at least one element designed to detect deformation of the membrane M. This detection element, designated by 6 only in FIG. 3, may comprise a plurality of resistances or piezoresistive elements, for example connected in bridge configuration, preferably obtained on the side of the membrane M not exposed to the fluid of which the pressure is to be measured. In other embodiments, the detection element 6 may comprise electrodes and/or capacitive elements, such as two facing electrodes, at least one of which provided on a side of the membrane M not exposed to the fluid. In the example, the detection element 6 is electrically connected to terminals, one of which designated by 7, for example fixed to the wall of the body 5 that defines the membrane M, in a peripheral position with respect to the latter. In the example, the terminals 7 are configured as elastic contacts, but this is not an essential characteristic.

In various embodiments, the sensor body is generally cup-shaped, meaning thereby a body having a peripheral wall closed at one end by a bottom wall, so as to define an axial cavity. In the case exemplified in FIGS. 3 and 4, the sensor body 5 includes a bottom portion, such as the one designated by 5a, and a peripheral portion, such as the one designated by 5b, which define an axial blind cavity, such as the one designated as a whole by C in FIG. 4.

The sensor body 5 is preferably monolithic, for example made of a ceramic material (such as alumina): as has been said, this does not constitute in any case an essential characteristic. The bottom portion 5a includes the membrane M, which closes the cavity C at one end of the sensor body 5, whereas the peripheral portion 5b has a distal or lower edge opposite to the bottom portion 5a, which delimits an inlet of the cavity C itself. The cavity C hence has a peripheral surface and a bottom surface, with the latter belonging to the membrane M (in particular, to the inner side of the latter).

In various embodiments, such as the one exemplified, the cavity C includes at least two regions of different diameter, for example a lower cavity region $C_1$, of larger diameter, and an upper cavity region $C_2$, of smaller diameter. In embodiments of this type, the cavity C of the sensor body 5 hence has at least one intermediate restriction (see the surface of transition designated by $C_3$ in FIG. 60), so as to define the lower region $C_1$, which is wider, and the upper region $C_2$, which is narrower. An embodiment of this sort proves advantageous in so far as it enables a reduction in the dimensions of the membrane M, which in this case forms the bottom of the narrower region $C_2$, and to which the corresponding deformation-detection element is in any case associated.

In various embodiments, the sensor body 5 includes at least two portions that have a different outer diameter, here corresponding, by way of example, to the portions 5a and 5b, which have a larger diameter and a smaller diameter, respectively. In this way, defined between the two portions 5a and 5b is a step 5c. Preferably, at the peripheral profile of the body 5—here at the portion 5a of greater diameter—axial recesses 5d are defined, the functions of which will likewise be clarified hereinafter.

In various embodiments, the compensation element 3 includes at least one respective compensation body, which is at least in part elastically deformable or compressible, such as the one designated as a whole by 8, and a reinforcement or core, fixed on which is the at least one compensation body, such as the reinforcement or core designated by 9.

In general terms, the compensation body 8 is made of a first elastically deformable or compressible material, for example an elastomer, hereinafter also defined as "elastically deformable body" or "deformable body", whereas the core or reinforcement 9 is made of a material relatively stiffer than the material of the body 8, for example a plastic, such as a thermoplastic or thermosetting polymer.

As per the known technique, the main function of the body 8 is to absorb any possible volumetric expansion of the fluid the pressure of which is to be measured, in particular in the event of freezing. However, as explained hereinafter, to the body 8, or to at least one of its parts, there may be assigned additional functions, for example that of elastic support of the assembly 1.

On the other hand, the main function of the reinforcement or core 9 is to keep the elastically deformable body 8 in a correct position and prevent—for example as a result of the pressure of the fluid or of an increase in volume thereof following upon freezing—the compliant material of the body 8 from undergoing any excessive deformation or extrusion against the membrane M, thus vitiating the signal of the sensor.

To clarify the question, it is to be considered that the compensation elements of a known type (such as those described in the aforementioned prior documents) are made of a relatively compliant material: axial and/or radial thrusts of the fluid on such an element that extends in the cavity of the sensor body could bring about over time a displacement of at least part of the compliant material towards the detection membrane, i.e., a sort of extrusion of at least part of this material. For instance, in particular conditions (such as occasional high pressures of the fluid in the system to which the sensor is connected) the thrust of the fluid under high pressure could exceed the limit of compression of the compliant material, the internal structure of which could be compacted to the point of undergoing a displacement following upon the thrust of the fluid, which in turn transfers the thrust onto other internal areas of the structure of the sensor. In other words, the displacement or extrusion of at least part of the compensation body could give rise to a deformation of the compliant material such as to cause a thrust of the material itself directly on the membrane of the sensor, with consequent alterations of the reliability of measurement or failure of the membrane. The use of the core 9 is also aimed at countering such phenomena and/or facilitating installation in the body 2.

The materials chosen for the body 8 and the core 9 are preferably materials that can be injection-moulded according to techniques that are widely used and inexpensive. For instance, the body 8 may be moulded with a silicone material, such as a silicone elastomer or a liquid-silicone rubber (LSR) or fluoro-liquid-silicone rubber (FLSR). The core 9 may be moulded with a polymer or a copolymer or a thermoplastic material, such as a polyamide PA or a polyphthalamide PPA, or a polypropylene PP.

The body 8 and the core 9 may be moulded separately and then assembled together, or else may be co-moulded, or else again the body 8 may be overmoulded on the previously moulded core 9.

In various applications of the sensor assembly 1, at least one elastically deformable or compressible annular element may be operatively associated to the sensor 2, which is designed to exert a sealing action between an outer surface of the sensor body 5 and a housing or seat in which the body itself is at least partially inserted. In the example illustrated, such a sealing element, in particular in the form of an annular gasket or O-ring, preferably made of elastomeric material, is designated by 10 and is designed to be fitted on the portion 5b of smaller diameter of the body 5.

As has been said, in various embodiments, the portion 5a of larger diameter of the body 5 has axial recesses or grooves 5d, which, as may be noted, for example, in FIG. 4, have one end located at the step 5c formed between the portions 5a and 5b of the body 5. In order to guarantee an optimal seal of the gasket 10 at said step 5c, notwithstanding the presence of the recesses 5d on the portion 5b of the body 5, there may advantageously be fitted a ring or flat washer 11, made of metal or plastic material, between the step 5c and the gasket 10: in this way, as may be noted, for example, in FIGS. 1 and 2, the washer 11 covers the corresponding end of the recesses 5d, thus providing an adequate surface for resting of the gasket 10 in an axial direction, also in order to improve the radial seal.

In use, for the pressure-sensor assembly 1 to be able to function adequately, it must be positioned within a corresponding final housing or seat of a device, provided with an inlet port for the fluid to be measured. Preferably, installation of the sensor assembly in the aforesaid seat should not be too tight (for example, because excessive mechanical stresses or residual stresses in the ceramic of the body 5 could cause major detection errors), nor too loose (for example, to prevent any possible micro-movements of the sensor 2, with the consequent possibility of seepage of the fluid and/or faulty electrical contacts and/or erroneous detections).

For these reasons, in various embodiments, the sensor assembly envisages an elastic supporting system. As will be seen, this system may be obtained either by exploiting the elastically deformable body 8 of the compensation element 3 or by exploiting the elastic properties of an additional element.

With reference to the latter case referred to, in various embodiments associated to the sensor assembly 1 is at least one annular elastically deformable or compressible supporting element, preferably made of elastomeric material, which is designed to exert a function of elastic support of the assembly itself. In various embodiments, the aforementioned elastic support is provided prevalently in an axial direction, between a surface of the core 9 and a surface of a shielding element (designated hereinafter by 4), or else between a surface of the core 9 and a surface (designated hereinafter by 31a) belonging to a seat into which the assembly 1 is at least partially inserted.

In the example illustrated in FIGS. 1-2, such an annular supporting element, on which the core 9 is designed to rest, is designated by 12. The element 12, for example of an O-ring type, does not necessarily perform sealing functions (it possibly in any case performing also the function of a gasket).

Figures 8, 9, 10:
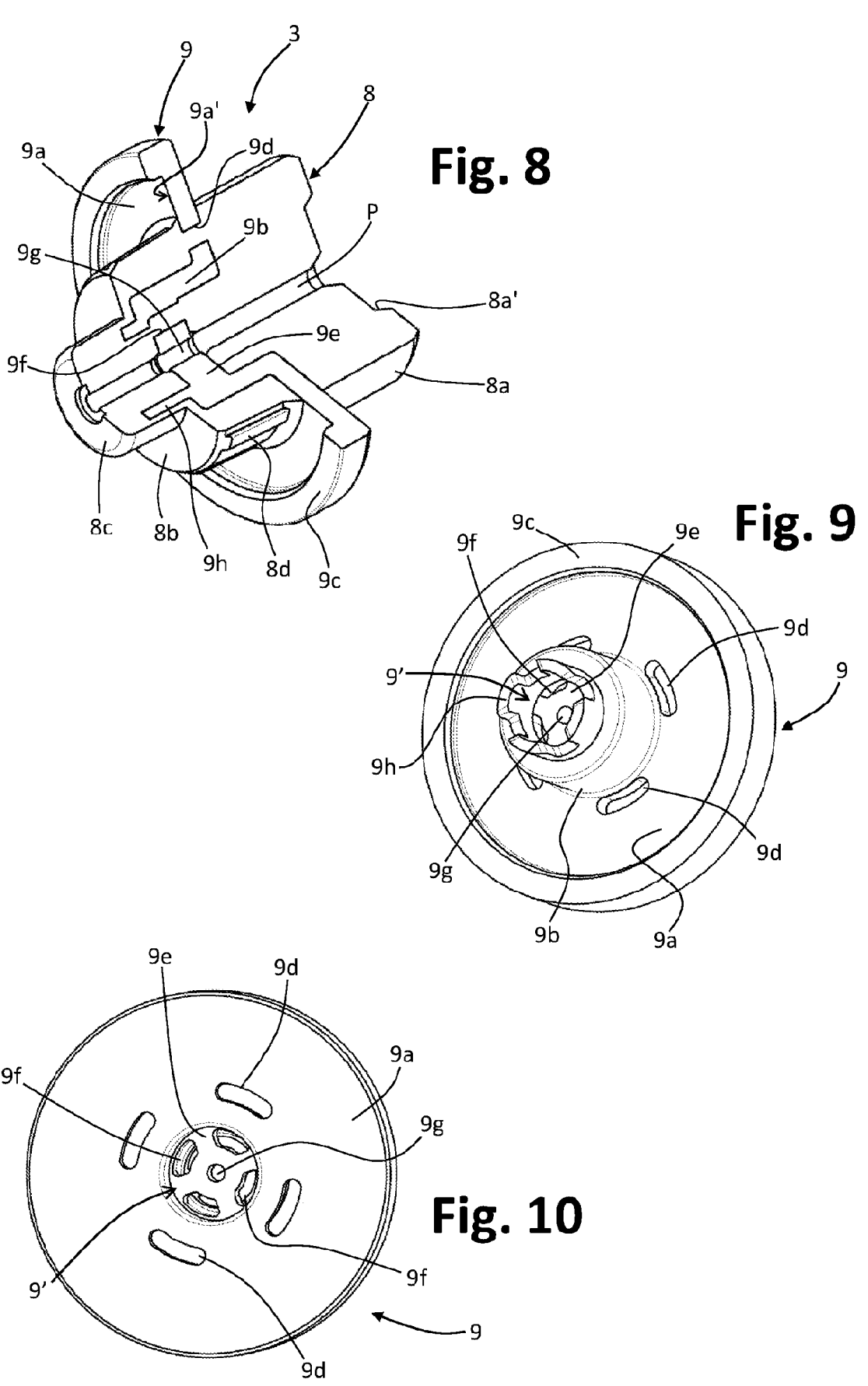
FIGS. 9 and 10 are perspective views from different angles of a core or reinforcement of a compensation element of a sensor assembly according to possible embodiments.

An example of compensation element 3 is represented in different views in FIGS. 5-8, whereas represented in FIGS. 9-10 is an example of core 9.

With initial reference to FIGS. 9-10, in various embodiments the core 9 has a preferably substantially disk-shaped main portion 9a, having a major face—here referred to conventionally as "upper face"—from which there preferably rises a central tubular portion 9b, defining a corresponding axial cavity 9'; in what follows, the portion 9a will also be defined as "flange portion" or "disk portion". The upper face of the flange portion 9a may be provided with a peripheral edge in relief 9c. The tubular portion 9b preferably opens also at the opposite face of the portion 9a (here referred to conventionally as "lower face"), upon which the annular element 12 is designed to bear, as will be seen hereinafter. In variant embodiments (not represented), the tubular portion 9b may extend from the opposite face of the flange portion 9a, or else a central tubular portion may extend both downwards and upwards starting from the portion 9a.

In various embodiments, the core 9 comprises one or more passages for corresponding parts of the material that forms the body 8, in particular in view of anchorage of the latter to the core itself. For instance, with reference to the example illustrated, defined at the disk portion 9a are one or more through openings 9d, in particular in a peripheral position with respect to the tubular portion 9b. Possibly, within the tubular portion 9b there may be provided a transverse wall 9e, which may have peripheral through openings 9f (FIGS. 9-10), and preferably at least one central through hole 9g.

In various preferential embodiments, the top of the tubular portion 9b is shaped so as to define a sort of crenellation 9h, i.e., an alternation of projections and recesses along the circumference of the portion 9b itself. The portion 9b preferably has a substantially circular cross section, possibly with stretches of different diameter, as in the example illustrated.

With reference now to FIGS. 5-8, in various embodiments, the elastically deformable body 8 is configured as body overmoulded on the core 9, preferably so as to leave in any case exposed at least one area of the core itself, preferably but not necessarily a peripheral area of its disk part 9a. For this purpose, in various preferential embodiments, the dimension of maximum lateral encumbrance (or maximum diameter) of the core 9 is greater than the dimension of maximum lateral encumbrance (or maximum diameter) of the body 8.

In the case exemplified, the body 8 is overmoulded in a single piece but so as to present at least two different parts that each extend at a respective major face of the disk portion 9a of the core 9, such as the two body parts designated by 8a and 8b in FIGS. 5-8. In the example represented, the body part 8a extends axially from the lower face of the portion 9a. In various embodiments, the aforesaid body part 8a, preferably having a substantially cylindrical shape, defines at its distal end face or lower face a recess 8a', the function of which will emerge clearly hereinafter.

The body part 8b extends axially from the upper face of the part 9a of the core 9, preferably so as to englobe within it at least part of the tubular portion 9b.

In various embodiments, such as the one exemplified, the elastically deformable body 8 defines in a single piece a further body part 8c, which extends over the top of the body part 8b and, preferably but not necessarily, englobes a respective top part of the tubular portion 9b of the core 9. Preferably, the body part 8b has dimensions of lateral encumbrance or diameter greater than the body part 8c, one or both of these body parts possibly having an at least slightly frustoconical conformation. The presence of the further body part 8c of the compensation body 8 is preferable when the cavity C of the sensor body 5 includes, as in the case exemplified, two regions $C_1$ and $C_2$ of different diameter.

In various preferential embodiments, the dimension of maximum lateral encumbrance or diameter of the body part 8b is smaller than the corresponding dimension of maximum lateral encumbrance or diameter of the flange portion 9a of the core 9, in such a way that a part of the latter defines a surface for resting of the distal end of the sensor body 5. With reference, in particular, to the example currently described, defined between the body part 8b and the outer diameter of the portion 9a of the core 9, i.e., its peripheral edge in relief 9c, is a seat—designated by 9a' in FIGS. 5 and 8—for positioning and resting of the lower edge of the portion 5b of the sensor body 5. In various embodiments, at least one portion of the core 9 (such as the portion 9a and/or the seat 9a') also provides a positioning and/or reference element, in particular with respect to the sensor body 5.

The aforesaid resting of the sensor body 5 on the corresponding surface of the core 9 prevents the risk that, in the assembly stage, the upper portion of the compensation element 3 (here the parts 8b and 8c of the body 8) may be inserted excessively into the cavity C of the sensor body 5: this prevents, for example, the risk of the top of the portion 8c possibly coming into contact with the inner side of the membrane M, and thus causing subsequent errors of detection of pressure by the sensor 2.

In this perspective, the height of the aforesaid upper portion of the compensation element (here understood as distance between the upper face of the disk part 9a and the top of the body part 8c) is less than the depth of the cavity C (understood as distance in a vertical direction between the lower surface of the body part 5a and the inner surface of the membrane M).

The presence of the disk part 9a of the core 9, or the presence of the aforesaid positioning and/or reference element, on which the sensor body 5 rests, also has the effect of preventing any excessive deformation or extrusions of the compliant material constituting the body 8, as explained above.

Figures 5, 6, 7:
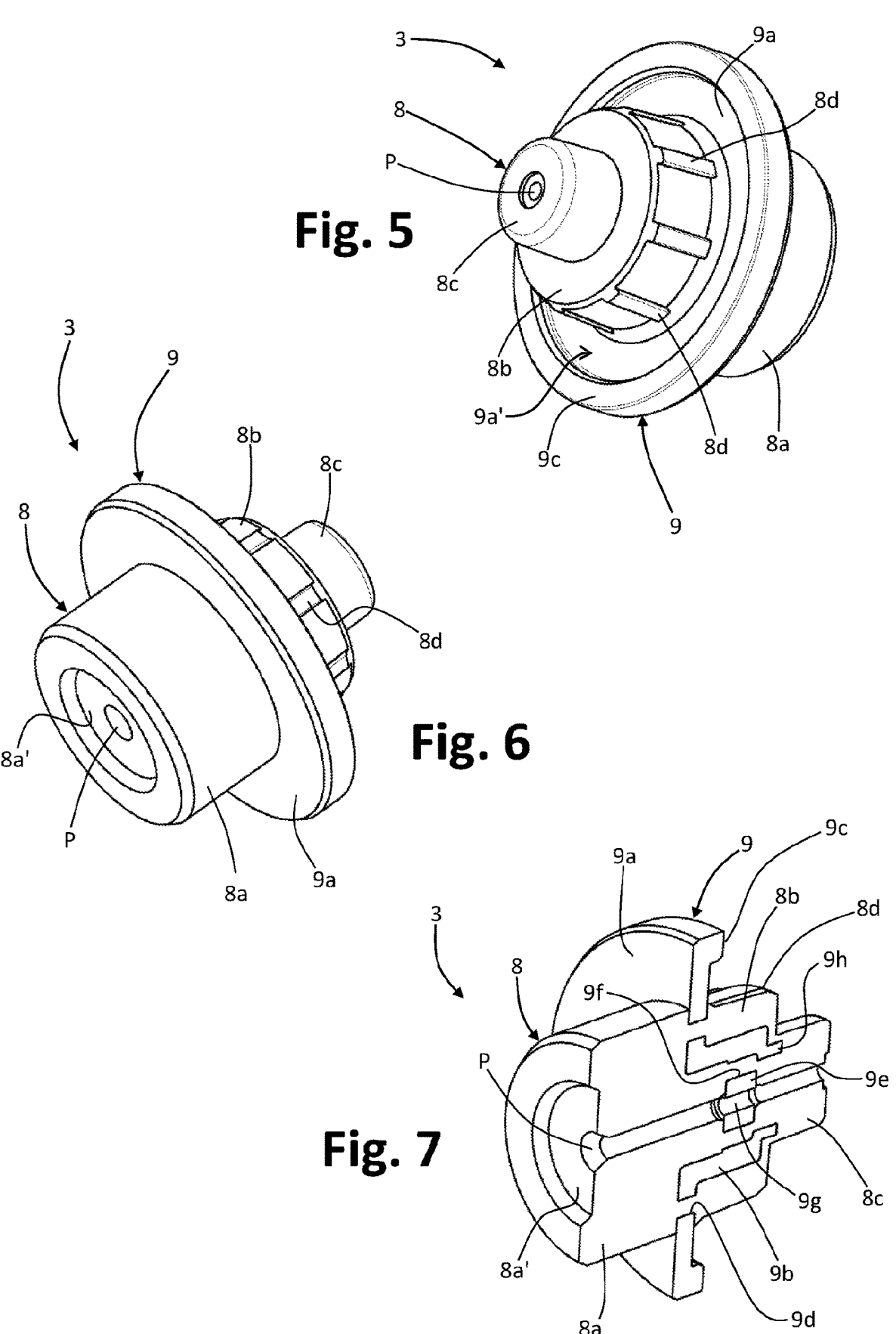
FIGS. 5 and 6 are perspective views from different angles of a compensation element of a sensor assembly according to possible embodiments.
FIGS. 7 and 8 are sectioned perspective views of a compensation element of a sensor assembly according to possible embodiments.

The body 8 is preferably overmoulded on the core 9 so that part of the material that constitutes it penetrates through the openings 9d of the core 9 and through the corresponding tubular portion 9b, thus ensuring fixing of the body 8 on the core 9, as may be clearly noted in FIGS. 7 and 8. From these figures it may likewise be noted that, when the tubular portion 9b is provided inside with the transverse wall 9e, part of the overmoulded material also penetrates through the openings 9f of the wall, further improving fixing thereof. The overmoulding equipment will be conceived—in a way in itself known—in order to prevent the overmoulded material from obstructing the central hole 9g of the transverse wall 9e, if this is envisaged.

In various embodiments, the body 8 is overmoulded so as to present at least one—preferably central—passage, designated by P, which extends between the two axial ends of the body 8 itself. If the core 9 envisages the transverse wall 9e inside the tubular portion 9b, the passage P is substantially coaxial to the respective hole 9g of this wall, preferably located in a central position: in this way, with reference to the example illustrated, a part of the passage P traverses axially the body part 8a, whereas the remaining part of the passage axially traverses the body parts 8b and 8c, as may be clearly noted from FIGS. 7-8.

From the same figures it may be noted how, preferentially, the entire tubular portion 9b is embedded in the material constituting the body parts 8b and 8c, with the top crenellation 9h of the tubular portion that contributes further to fixing between the overmoulded material and the core 9.

As already mentioned, in various embodiments, at least one of the two portions of the elastically deformable body that extend on opposite sides of the core is designed to be received at least partially within the cavity C (FIG. 4) of the sensor body 5. In the example, the portion in question is the one formed by the body parts 8b and 8c. As has been said, the part 8c is to be understood as optional, albeit particularly useful for the purposes of compensation in the case of sensors with a cavity C that has two regions $C_1$ and $C_2$ of different diameter.

According to an important aspect, at least part of the portion of the elastically deformable body, for example a part that is designed to be housed at least partially within the cavity of the sensor body, is configured so as to enable mounting by elastic interference within the cavity itself.

In various embodiments, for this purpose, the aforesaid portion of the elastically deformable body has at least one positioning and/or fixing element, in particular between the compensation element and the sensor body, for example a plurality of peripheral ribbings or reliefs, distributed along or according to a circumferential wall of the portion itself, where the ribbings or reliefs facilitate positioning and also correct assembly between the compensation element and the sensor body.

With reference to the case exemplified in FIGS. 6-8, the aforesaid positioning and/or fixing elements comprise axial reliefs, which are designated by 8d and are defined at the peripheral wall of the body part 8b. In addition or as an alternative, similar elements or reliefs could be provided in the body part 8c. In general terms, the outer surface of the various reliefs 8d identifies a circumference wider than the corresponding part of the cavity C (it being, obviously, understood that the cavity part $C_1$ and the body part 8b may have a frustoconical or at least partially inclined peripheral profile).

In various embodiments, the reliefs 8d are defined integrally by the compensation element 3, in particular by the body 8, and enable insertion with slight elastic interference of the portion 8b-8c of the body 8 within the cavity C of the sensor body 5, in any case in a way sufficient to guarantee positioning and coupling of the former with respect to the latter.

This characteristic proves particularly advantageous in the production stage in so far as it enables pre-assembly between the sensor 2 and the compensation element 3, that is, the production of a self-standing or independent sensor assembly 1, which can be easily handled as a single unit; i.e., it can be stored, or transported, or mounted as a single component.

Hence, an assembly according to the invention may be easily produced and assembled via automatic lines belonging to a first entity (for example, a manufacturer of pressure-sensor devices) as a single device, without its parts separating from one another during handling, albeit in the absence of an outer casing. This assembly may then be easily transported to a second entity (for example, a manufacturer of vehicle components) in order to be assembled or integrated in a different apparatus, without prejudice to case of handling of the assembly on automatic assembly lines belonging to the second entity.

As has been said, the compensation element 3 may likewise define a surface or a seat (9a', FIGS. 5 and 8) for positioning and resting of the sensor body 5, or of the distal end of the portion 5b, where fitted on the portion 5b are the resting ring 11 and the sealing element 10, which is preferably mounted with elastic radial interference on the portion 5b: in this way, following upon coupling between the parts in question, the ensemble that includes the components 2, 3, 10 and 11 may be easily handled as a single unit.

The reliefs 8d enable the aforementioned insertion with elastic inference in a convenient and precise way, with only modest local deformations of the body 8, practically only at the reliefs themselves: in this way, there is prevented the possibility, in the course of insertion, of excessive and/or undesirable deformations of the body 8 as a whole. As has been said, the flange part 9a of the core 9 may advantageously constitute a reference or positioning element or mechanical end-of-travel for the aforesaid insertion.

Figure 11:
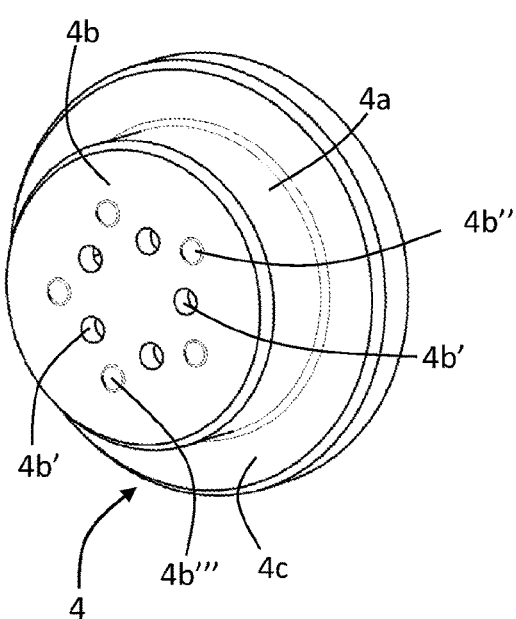
FIGS. 11 and 12 are perspective views from different angles of a shielding element for a sensor assembly according to possible embodiments.
Figure 12:
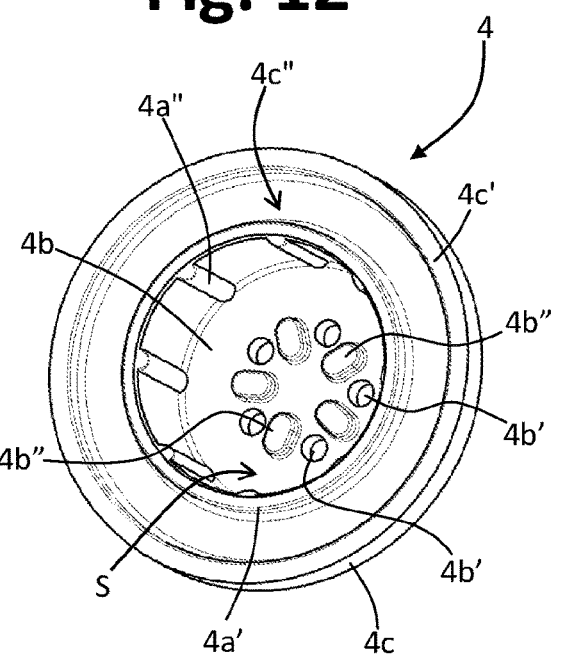

As mentioned previously, the sensor assembly of a device according to the invention may optionally include a shielding element, designated as a whole by 4, which is illustrated in isolation in FIGS. 11 and 12.

The element 4 has a body preferably formed via moulding of a polymer or plastic material, for example a thermoplastic or thermosetting material, including a generally cup-shaped part, preferably having a substantially circular cross section, including a bottom wall that has at least one opening, possibly provided at one end with a radially projecting flange part.

In the example illustrated, the generally cup-shaped part includes a substantially cylindrical peripheral wall 4a and a bottom wall 4b, which delimit a cavity or seat designated by S only in FIG. 12. The bottom wall 4b is provided with one or more through openings 4b' and possibly, on its inner side with respect to the seat S, with one or more reliefs 4b". In the example, a series of openings 4b' and a series of reliefs 4b" are interspersed with one another according to a circumference, in particular in a central region of the wall 4b. Preferentially, in the condition where the element 4 is assembled on the body 8, the opening 4b' or each opening 4b' is in an axial position staggered with respect to the passage P of the compensation element 3, for the reasons that will be clarified hereinafter.

In various embodiments, a flange 4c projects radially outwards from the peripheral wall 4a of the element 4, preferably just slightly underneath the end edge 4a' of the wall 4a itself that delimits the mouth of the seat S, where the preferably circular flange has a surface on which the annular element 12 can rest.

In the example illustrated, the aforesaid flange 4c has a peripheral edge in relief 4c', on the same side as the edge 4a'. In this way, defined between the two edges 4a' and 4c' is a groove or seat 4c", for positioning of the annular element 12, in particular of the part thereof opposite to the one resting on the lower face of the core 9 of the compensation element 3.

In various preferential embodiments, defined on the inner side of the peripheral wall 4a of the element 4 are means for positioning and/or coupling with respect to the compensation element 3, in particular with respect to the body 8. In various embodiments, these means comprise axial reliefs or ribbings, such as the one designated by 4a" in FIG. 12. Similar positioning and/or coupling means, such as reliefs and/or ribbings, could possibly be provided on the compensation element, in particular on its body 8 (in particular, the corresponding part 8a).

The reliefs 4a" identify a circumference slightly smaller than that of the part 8a of the elastically deformable body 8 of the compensation element 3: in this way, the shielding element 4 can be fitted with slight interference on this part 8a on the compensation element 3. Hence, also in this case, the reliefs 4a" enable insertion of the part 8a of the body 8 with a slight elastic interference within the seat S of the shielding element 4, in any case in a way sufficient to guarantee positioning and coupling of the former with respect to the latter.

Also this characteristic proves particularly advantageous in so far as it enables pre-assembly between the sensor 2, the compensation element 3, and the shielding element 4, for the purposes of subsequent joint manipulation, i.e., handling as a single component, albeit without outer casing.

As has been said, the shielding element 4 can define a surface or seat (4c" in FIG. 12) for positioning of a respective part of the annular element 12: in this way, following upon coupling between the parts, the sensor assembly 1—including the components 2, 3, 4, 10, 11 and 12—can be easily handled as a single component. The assembled condition of the aforesaid assembly is visible in FIG. 2, where it may be noted how the sealing element 10 is set between the resting ring 11 (which is in turn fitted on the part 5b of the sensor body 5) and the upper face of the core 9, substantially at its peripheral edge in relief 9c, and how the annular element 12 is set between the flange 4c (i.e., the seat 4c" of FIG. 12) of the shielding element 4 and the lower face of the flange part 9a of the core 9.

In various embodiments, a pressure-sensor device according to the invention includes a structure configured for housing at least partially the component sensitive to the pressure to be detected, i.e., the sensor 2 of the assembly 1. This structure may even form part of a different device, for example a hydraulic device or a pneumatic device.

In various preferential embodiments, the housing structure may be configured like a casing, which houses practically completely the assembly and may comprise at least two coupled parts, which preferably perform also positioning and/or supporting functions. In various embodiments, one of the two parts preferably performs also functions of electrical connection, and the other part preferably performs also functions of hydraulic connection. In other embodiments, the aforementioned structure may, instead, house the sensor assembly only partially and may comprise for this purpose even just one casing part, for example performing functions of electrical connection or else hydraulic connection: in embodiments of this type, a device according to the invention can be coupled to a different functional component (for example, a fluid pump), the body of which defines a seat or housing that is designed to receive a corresponding part of the device, in particular of its sensor assembly 1.

Figure 13:
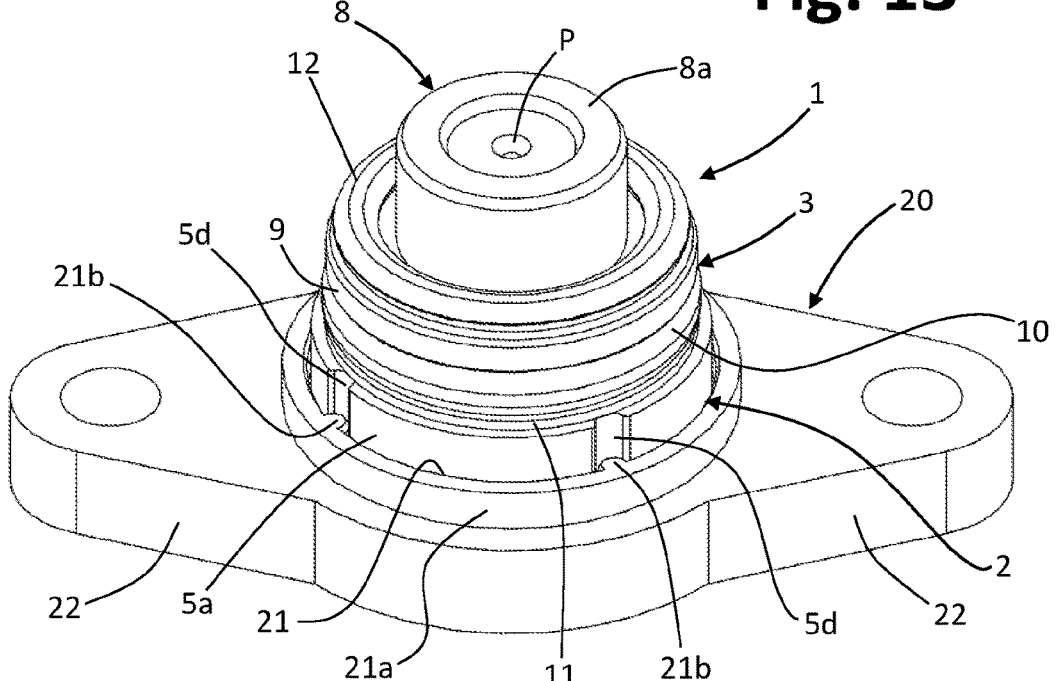

FIGS. 13 and 14 exemplify the second case referred to above, where the housing structure of the device includes a body 20, hereinafter referred to also as "closing body", which preferably performs positioning and electrical-connection functions. It should be noted that in these figures the representation of the shielding element 4, which is in any case optional, is omitted.

In the example illustrated, the body 20 defines a central seat 21, at least partially inserted within which is the sensor 2, i.e., its body 5. The body 20 may be made of electrically insulating material, for example moulded with plastic material, and have, as in the example, at least one bracket 22 for fixing to a different component, for example the body of a fluid pump, or else a hydraulic assembly of an SCR (Selective Catalytic Reduction) system or of a Water Injection system of a vehicle. In the example, the body 20 has a wall in relief 21a, preferably cylindrical, which defines at least part of the seat 21. Preferentially, on the inner side of the wall 21a axial reliefs 21b are provided, which are designed to couple to the axial recesses 5d of the part 5a of the sensor body 5 in order to guarantee correct mutual angular positioning.

The components 2, 3, 10, 11, 12 (and 4, when envisaged) may then be assembled together in the way described above, and the self-standing sensor assembly thus obtained can be handled—possibly in an automated way—in order to position the sensor body 5 within the seat 21 of the body 20, as illustrated in FIGS. 13 and 14. From FIG. 14 it may be noted how the body 20 can define, on its side opposite to the one where the seat 21 opens, a passage 23 for access to the terminals 7 of the sensor, here configured as spring contacts. In the body 20 there may also be defined a cavity 24, at the seat 21, where the contacts 7 are at least partially received (see FIGS. 17-18). This cavity 24, which may possibly have a peripheral profile substantially corresponding to that of the seat 21, is preferably provided with one or more abutment surfaces 24a for the upper face of the sensor body 5.

Figure 16:
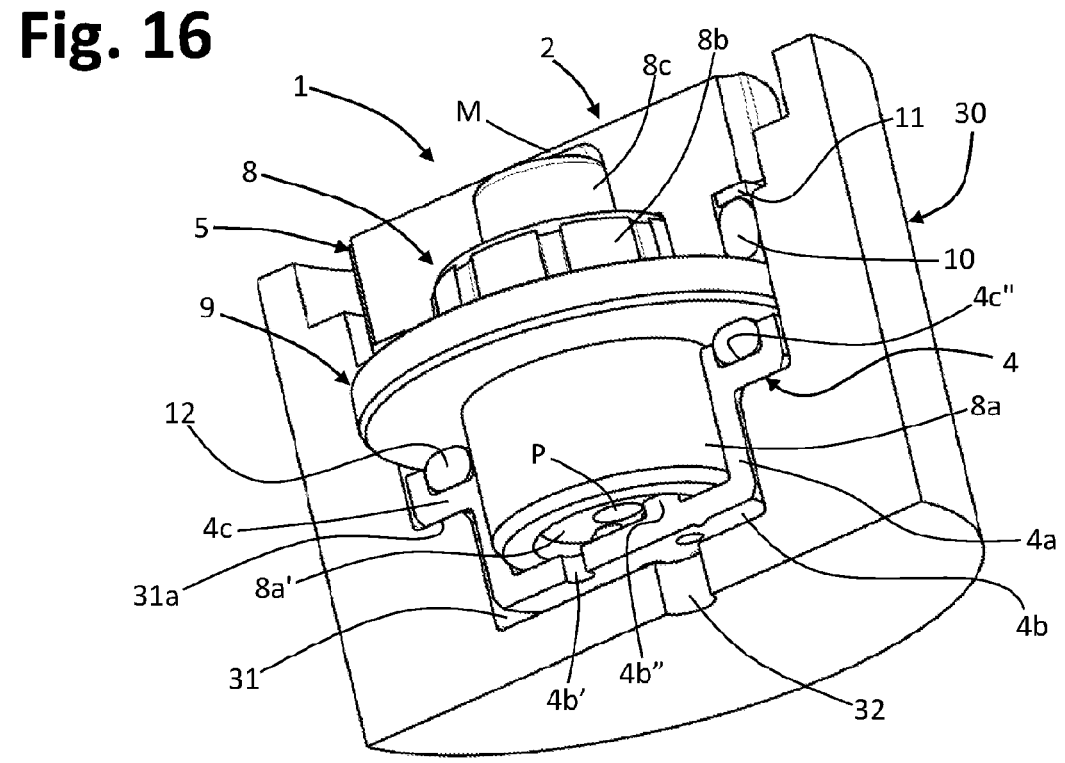

FIGS. 15 and 16 exemplify the case where the housing structure of a device according to the invention includes, instead, a body 30, hereinafter also referred to as "casing body", which performs positioning and hydraulic-connection functions.

In the example, the body 30 is substantially cup-shaped and defines a housing or seat 31, at least partially inserted in which is the sensor assembly 1, here including the components 2-4 and 10-12. The body 30 may be made of electrically insulating material, for example moulded with thermoplastic material, and may have, as in the example, an inlet passage for the fluid 32, preferably at a bottom wall thereof.

The seat 31 is preferably shaped and sized according to the shape and size of the components of the assembly 1 to be housed. For instance, in various embodiments, the seat 31 defines at least one intermediate step 31a, which provides a rest for the flange 4c of the shielding element 4 (or else for the annular supporting element 12). In this way, as may be noted, for example, in FIG. 16, the step 31a supports the shielding element 4, which in turn elastically supports the compensation element 3 by way of the supporting element 12, which is housed in the seat 4c" of the flange 4c itself and on which the lower face of the core 9 (i.e., of its part 9a) rests. Preferably, the shielding element 4 is sized in such a way that, in the condition illustrated, its bottom wall 4b is at least slightly raised, i.e., at a distance, with respect to the bottom wall of the seat 31, where the inlet passage 32 of the fluid is located, for example to prevent the wall 4b possibly obstructing the inlet 32 of the seat 31 and/or to maintain in any case a passage or a chamber in the lower region of the seat 31 in order to enable distribution of the liquid from the inlet 32 towards the passages 4b' of the shielding element 4.

The aforementioned distance is guaranteed by the resting of the part 9a on the step 31a, and possibly also by the presence of reliefs, such as the ones designated by 4b''' in FIG. 11, defined on the outer side of the bottom wall 4b of the shielding element. In the case of particularly unfavourable dimensional tolerances, these reliefs 4b''' can come to rest on the bottom of the seat 31, thus keeping the shielding element 4 slightly raised, in such a way as in any case to guarantee that the fluid will flow from the inlet 32 towards the passages 4b'.

Once again from FIG. 16 it may be noted how, preferably, in the assembled condition, the openings 4b' and the reliefs 4b'' present on the inner side of the aforesaid bottom wall 4b are located at the recess 8a' defined in the lower-end face of the part 8a of the body 8 of the compensation element. It may be noted in particular how the bottom of the recess 8a' rests on the aforesaid reliefs 4b'', so that between the inlet of the passage P of the body 8 and the openings 4b' of the element 4 there exists in any case a free space, designed to enable passage of the fluid.

From FIGS. 15 and 16 it may likewise be noted how, in the assembled condition, the sealing element 10, fitted on the part 5b of the sensor body 5 together with the resting ring 11, exerts a radial seal with respect to the peripheral surface of the seat 31. From the same figure it may be clearly noted how the two regions $C_1$ and $C_2$ of the cavity of the sensor body 5 are occupied by the parts 8b and 8c of the deformable body 8 of the compensation element, the top of the part 8c being in any case at a distance from the membrane M.

Figure 17:
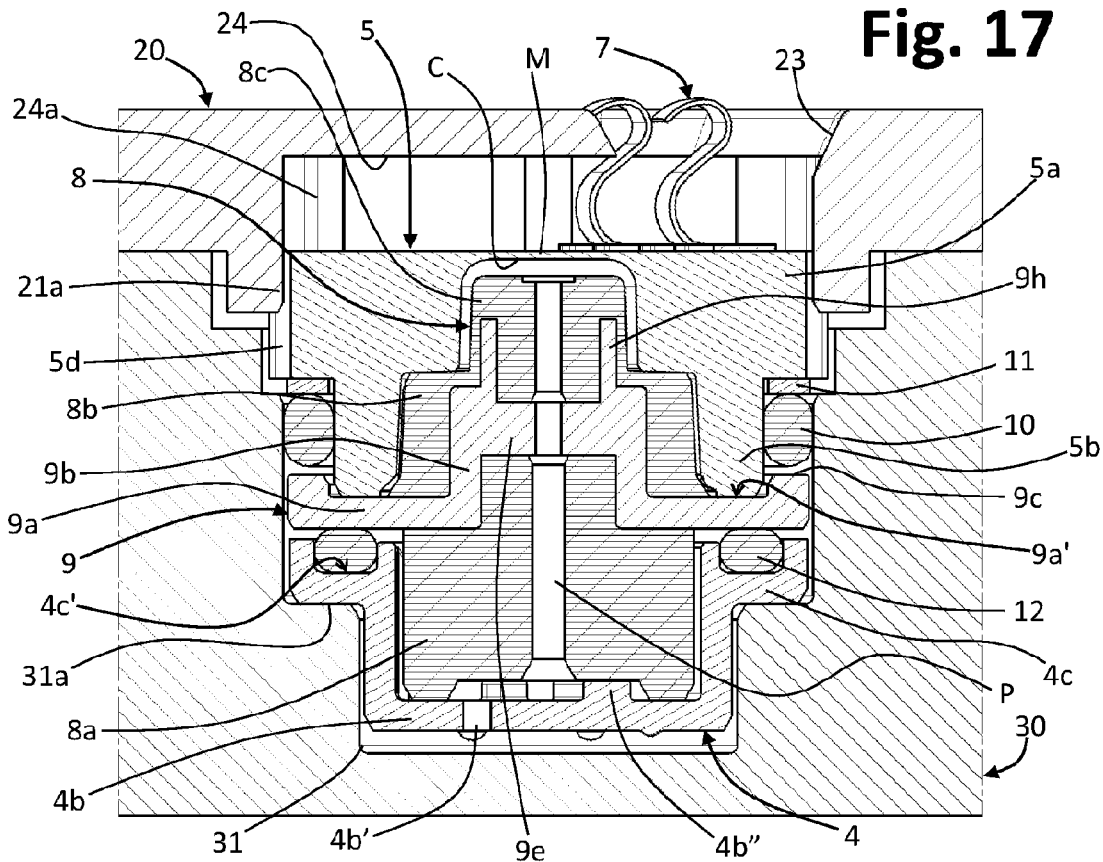
FIGS. 17 and 18 are partial cross-sectional views, according to mutually orthogonal planes, of a pressure-sensor device according to possible embodiments, including a sensor assembly and casing parts structurally similar to the ones illustrated in FIGS. 13-14 and 15-16.
Figure 18:
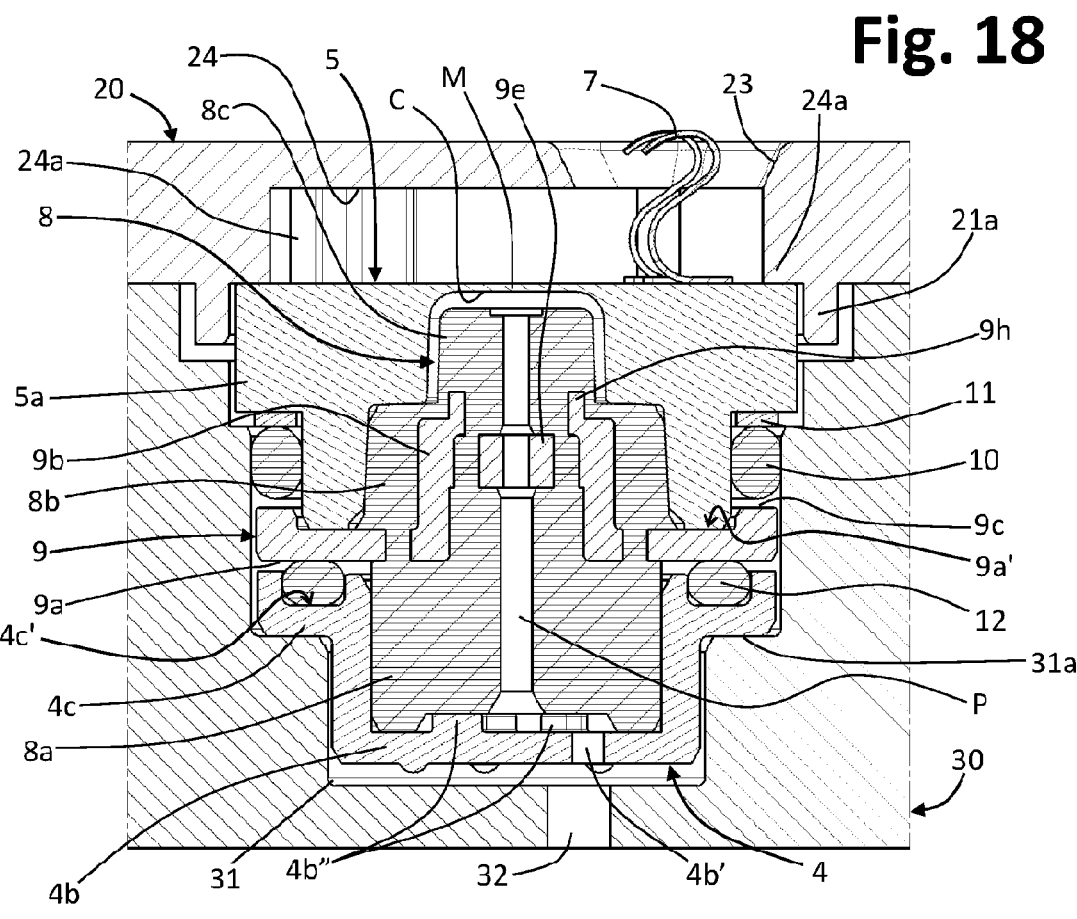
Figure 19:
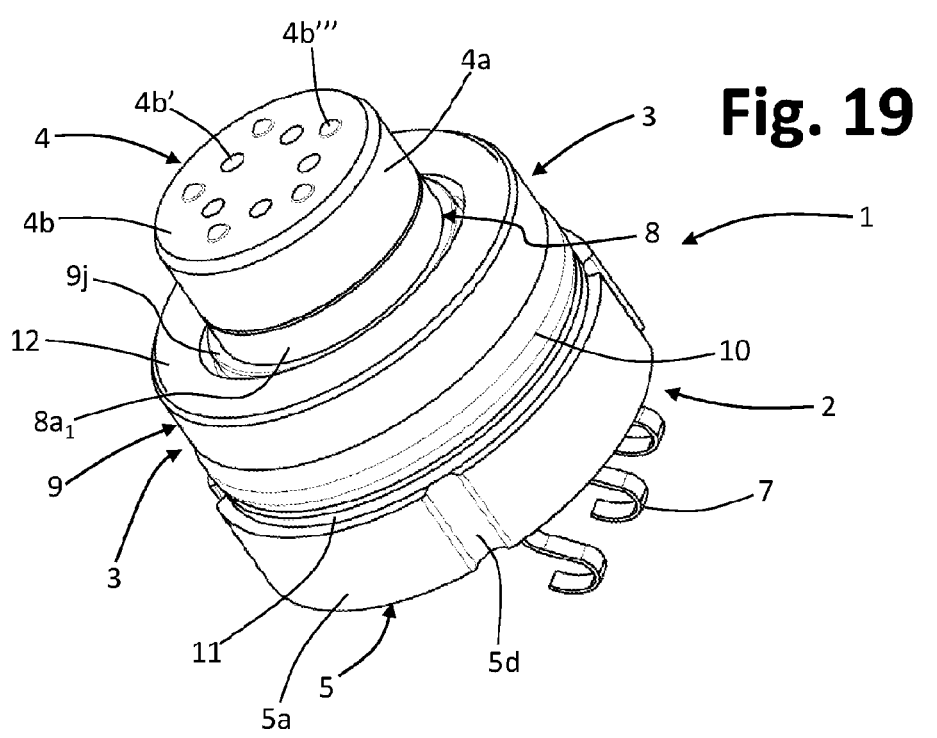
FIG. 19 is a perspective view of a sensor assembly with a corresponding shielding element coupled thereto, according to further possible embodiments.

The partially sectioned views of FIGS. 17 and 18 represent the case of a device according to the invention the housing structure of which includes a closing body 20 of the type illustrated in FIGS. 13-14 and a casing body 30 of the type illustrated in FIGS. 15-16, coupled together with interposition of the sensor assembly.

Also from these figures there may be clearly noted the relative positioning between the step 31a of the seat 31 and the flange 4c of the shielding element 4 so as to keep the sensor assembly—and, in particular, the bottom wall 4b of the shielding element 4—at a distance from the bottom surface of the seat 31 of the body 30, and with the lower part 8a of the compressible body 8 that preferably rests on the inner side of the bottom wall 4b and on the corresponding reliefs 4b'': in this way, as explained, fluid communication between the inlet passage 32 of the fluid and the axial passage P of the compensation element 3 is in any case ensured. Once again from FIGS. 17-18 it may be noted how the annular supporting element 12 is positioned within the corresponding seat 4c" of the flange 4c, and how the lower face of the flange part 9a of the core 9 rests on the element 12: as has been said, in this way, the compensation element, and hence the sensor body 5, are supported in an elastic way with respect to the body 30. The presence of the annular element 12 may prove advantageous in those embodiments in which the sensor body 5 and the compensation element associated thereto are constantly urged into the seat 31 of the casing body 30, for example via the action of the elastic contact elements 7 or of the abutment or contrast surfaces 24a of the body 20. The presence of the element 12 hence enables an "elastic assembly" to be obtained, i.e., an assembly that renders possible slight variations or compensation of the axial positioning of the sensor body 5 and of the compensation element, for example for compensating possible dimensional variations of the various elements or parts of the device, or else for preventing excessive stresses during the steps of assembly and/or during operation.

From the same figures there may be noted the position of radial seal between the gasket 10, possibly resting on the corresponding ring 11, and the peripheral surface of the seat 31 of the body 30, and it may likewise be noted how the lower end of the portion 5*b* of the sensor body 5 rests, instead, on the upper face of the flange part 9*a* of the core 9, within the seat 9*a*'.

It should be noted that, in the condition exemplified in FIGS. 17-18, the sealing element 10 is located at a certain distance from the upper surface of the peripheral edge in relief 9*c* of the flange 9, but this does not constitute an essential characteristic, in so far as the components could be sized in such a way that the element 10 rests on the edge 9*c*.

The shielding element 4 can, for example, be used in applications in which the volume of just the compensation element 3 (i.e., of its elastically deformable body 8) is deemed insufficient to compensate for the increase in volume of the liquid undergoing freezing: in these cases, the frozen fluid could exert a significant stress on the membrane M of the sensor 2. In this perspective, the element 4 also performs the function of a labyrinth in so far as it enables passage of the fluid through its openings 4*b*' in a position staggered with respect to the central passage P of the compensation element: this geometry in effect generates a labyrinthine path for the fluid between the inlet 32 and the passage P, thus limiting the risk of a high axial force exerted by the frozen fluid, through the same passage P, directly on the membrane M of the sensor 2.

Exemplified in FIGS. 19-31 are possible alternative embodiments of one or more components of a sensor assembly 1 according to the invention.

Figure 20:
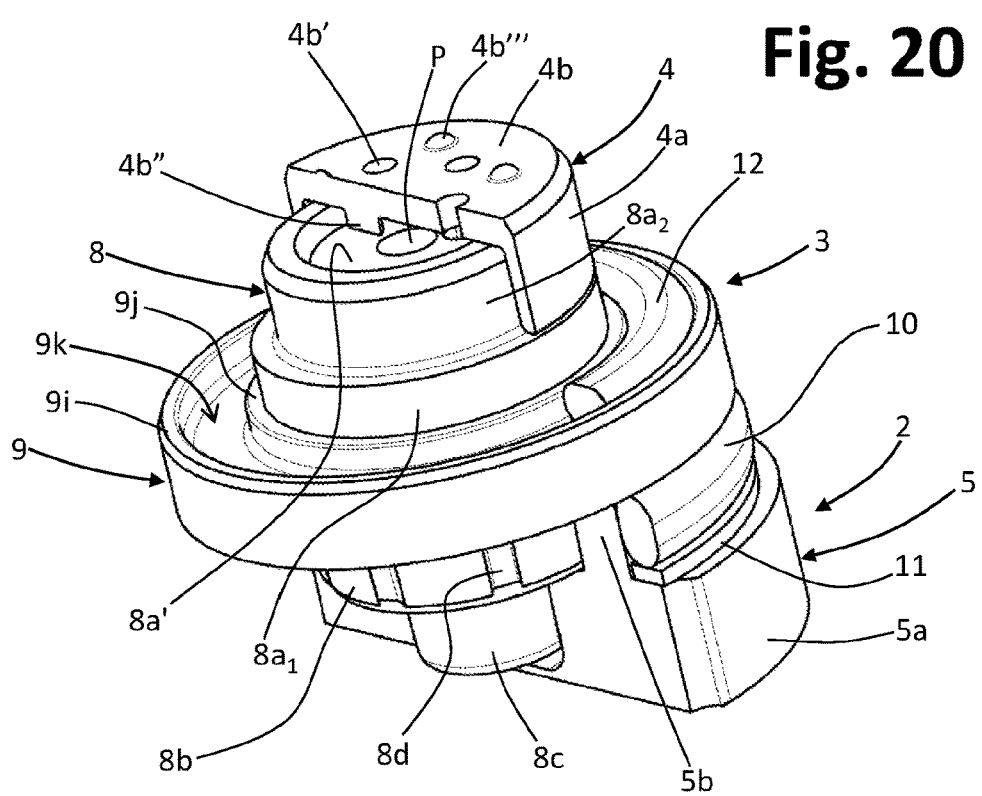
FIG. 20 is a sectioned perspective view of the sensor assembly of FIG. 19.
Figure 21:
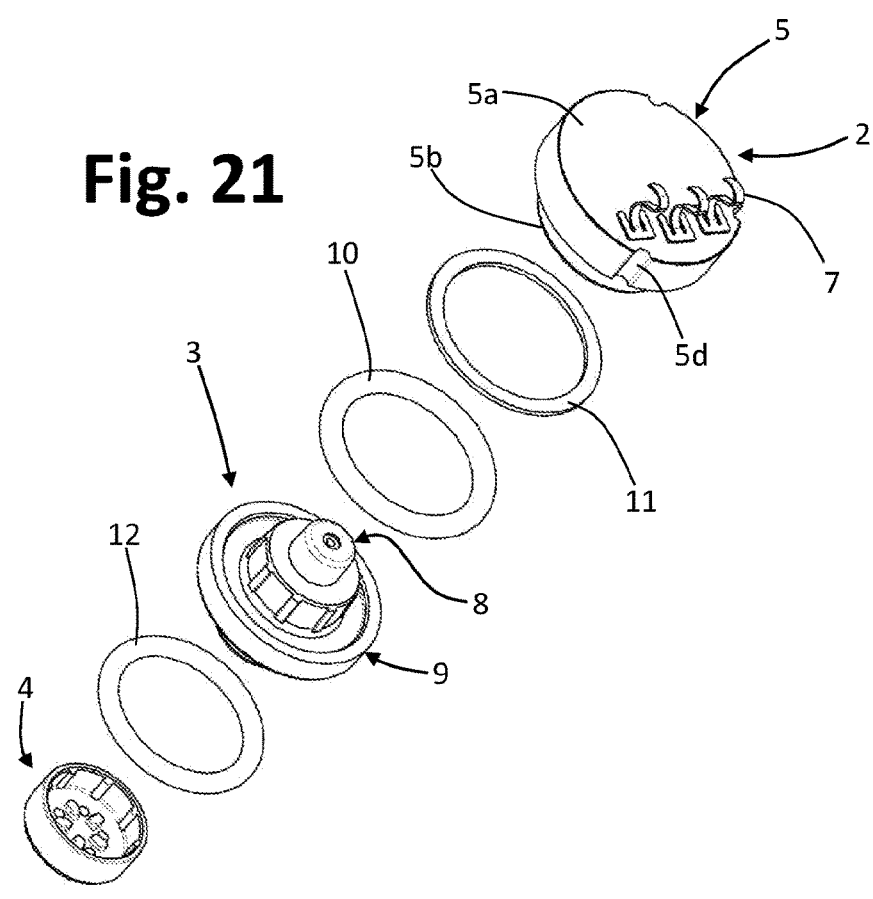
FIGS. 21 and 22 are exploded views of a sensor assembly of the type illustrated in FIG. 20.
Figures 22, 23:
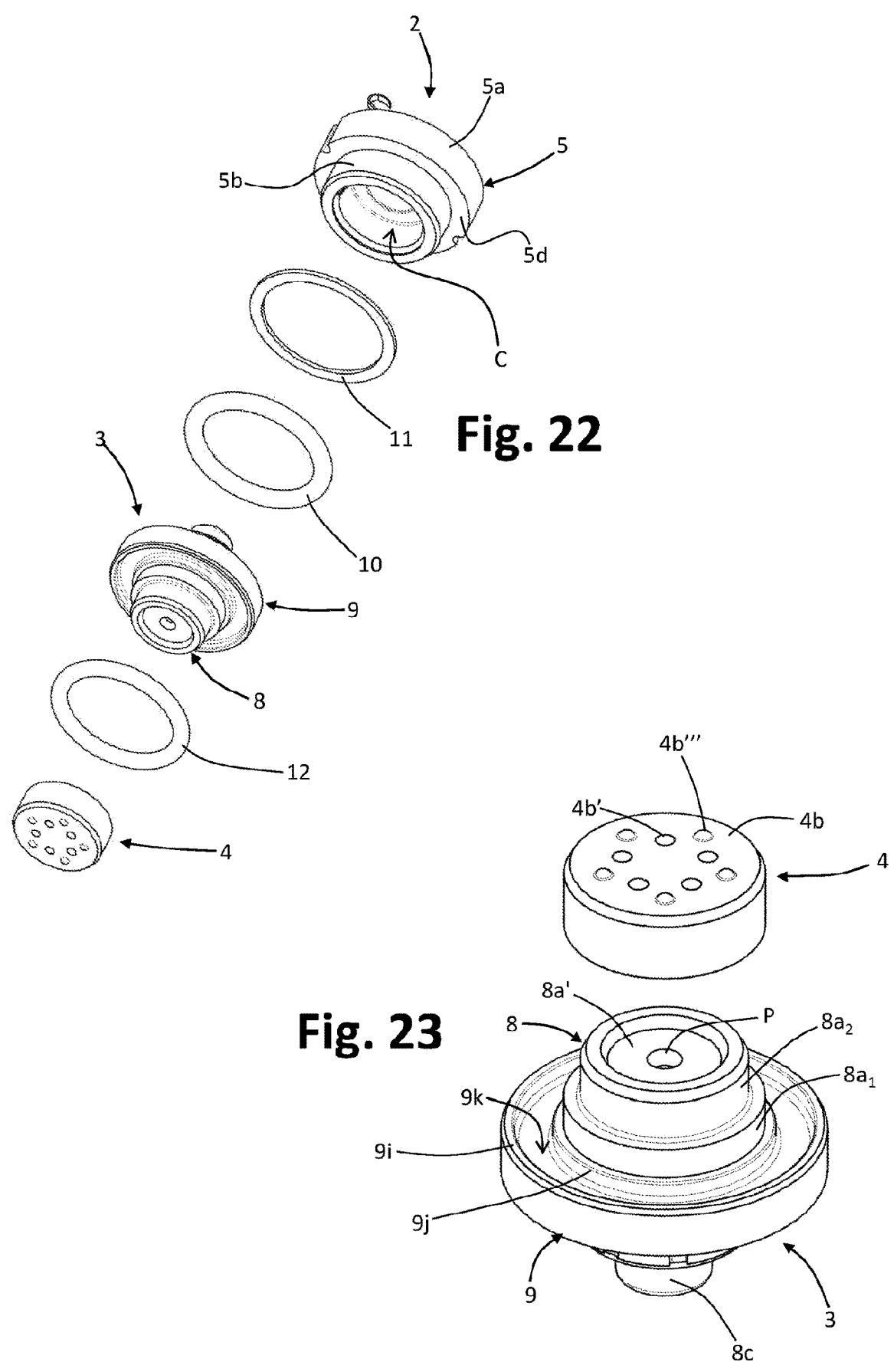
FIGS. 23 and 24 are perspective views of a compensation element for a sensor assembly of the type illustrated in FIG. 19, with the corresponding shielding element represented in exploded view.

In the case exemplified, the assembly 1 includes a shielding element 4, which, according to possible embodiments, has a body without the flange designated previously by 4*c*; i.e., it includes just the peripheral wall 4*a* and the bottom wall 4*b*, provided with the openings 4*b*' and the internal reliefs 4*b*", and possibly the external reliefs 4*b*'", as may be clearly noted from FIG. 20.

Figure 24:
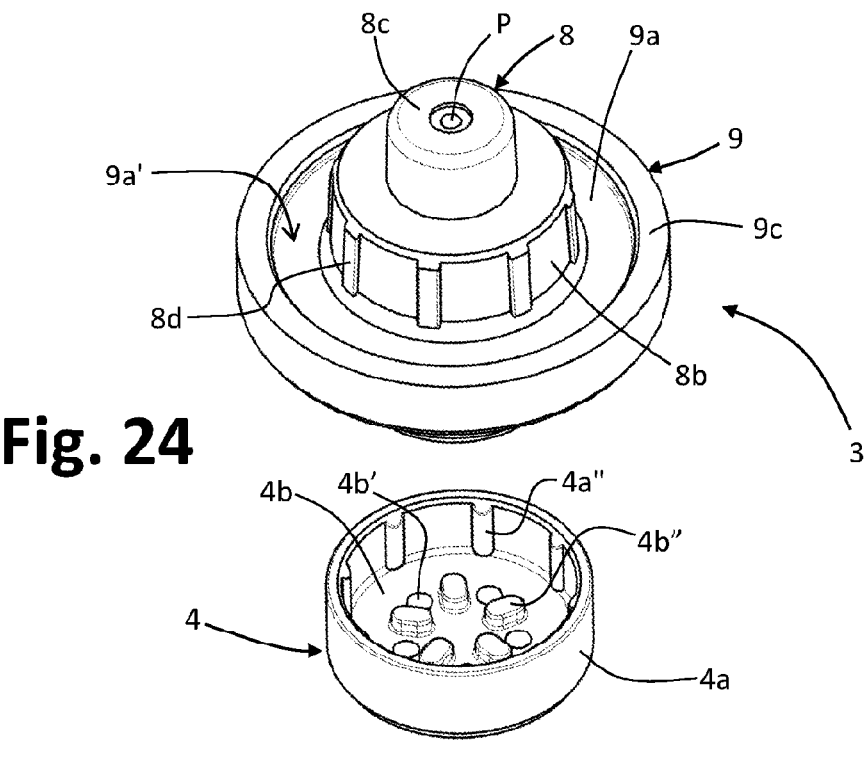
Figure 25:
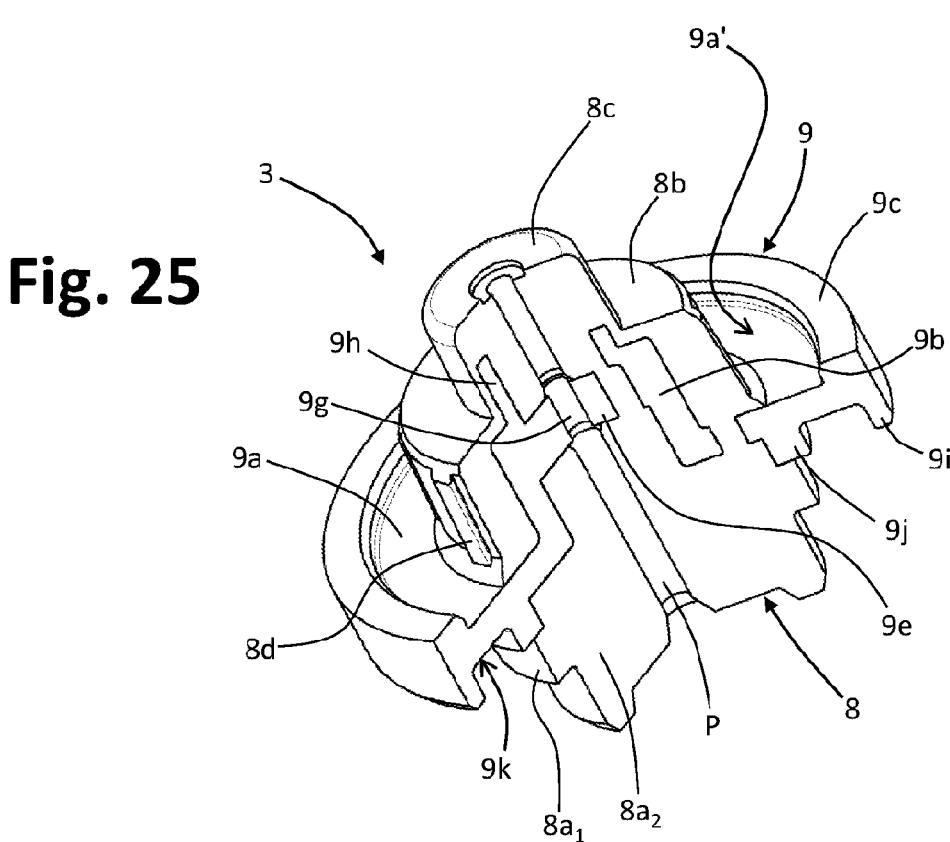
FIG. 25 is a sectioned perspective view of just the compensation element of FIGS. 23-24.

Also in this case, as may be noted from FIG. 24, on the inner side of the peripheral wall 4*a* positioning and/or fixing means may be provided, such as the axial reliefs 4*a*", for installation with slight interference with respect to the deformable body 8 of the compensation element 3.

In various embodiments, such as the one exemplified in FIGS. 19-31, the core 9 of the compensation element 3, in particular its part 9*a*, is configured so as to define a seat for the annular element 12 at its lower face.

With reference, for example, to FIGS. 20, 23 and 25-27, the core 9 has a structure substantially similar to the one illustrated in FIGS. 9-10, with the corresponding disk part 9*a* provided, at its upper face, with the peripheral edge in relief 9*c*, which is, however, optional. In this case, the part 9*a* has a similar peripheral edge in relief also at its lower face, designated by 9*i*, there being provided on the bottom face also a cylindrical wall in relief 9*j*, having a diameter smaller than that of the edge 9*i*, which here circumscribes a region within which the through openings 9*d* and/or an end of the cavity 9' of the tubular portion 9*b* may possibly be located. In this way, delimited between the edges 9*i* and 9*j* is a seat, designated by 9*k*, for positioning of the annular supporting element 12, as may be seen, for example, in FIG. 20.

Also in the case exemplified in FIGS. 19-31, the elastically deformable body 8 of the compensation element 3 is overmoulded on the core 9, according to what has already been described previously. The part of the body 8 that extends from the lower face of the core 9 may present, as in the example illustrated, two portions of different diameter, and in particular—with reference, for example, to FIGS. 20, 23 and 25—a portion 8*a*₁ of larger diameter, closer to the disk part 9*a* of the core 9 and a portion of smaller diameter 8*a*₂, which extends from the portion 8*a*₁, where the diameter of the portion 8*a*₂ is such as to enable fitting thereon, with slight elastic interference, of the shielding element 4, as may be noted, for example, from FIG. 20. From FIG. 20 it may be noted how, preferably, the peripheral wall 4*a* of the element 4 bears upon the step defined between the portions 8*a*₁ and 8*a*₂ of the elastically deformable body 8.

Figure 29:
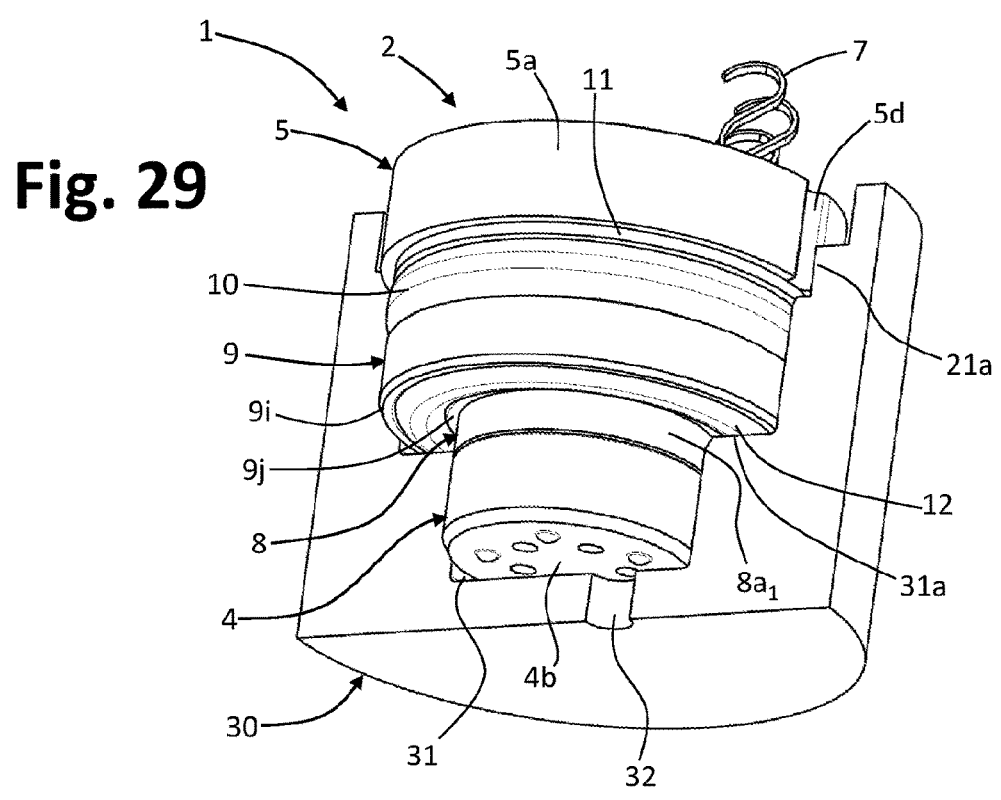

FIGS. 28 and 29 exemplify the case of installation of the sensor assembly in a casing body 30 substantially similar to the one already illustrated previously in FIGS. 15-16, which defines the corresponding seat 31 provided with an inlet passage 32 for the fluid. As may be noted, in embodiments of this type, the compensation element 3, i.e., its core 9, is set resting on the step 31*a* of the seat 31 by way of the annular element 12, with the compensation element itself and the sensor body 5 associated thereto that are then elastically supported with respect to the casing body 30, thus enabling the aforementioned elastic assembly. The operating position of the shielding element 4 is similar to the one already described previously, i.e., with its bottom wall 4*b* at a distance from the bottom wall of the seat 31.

Figure 30:
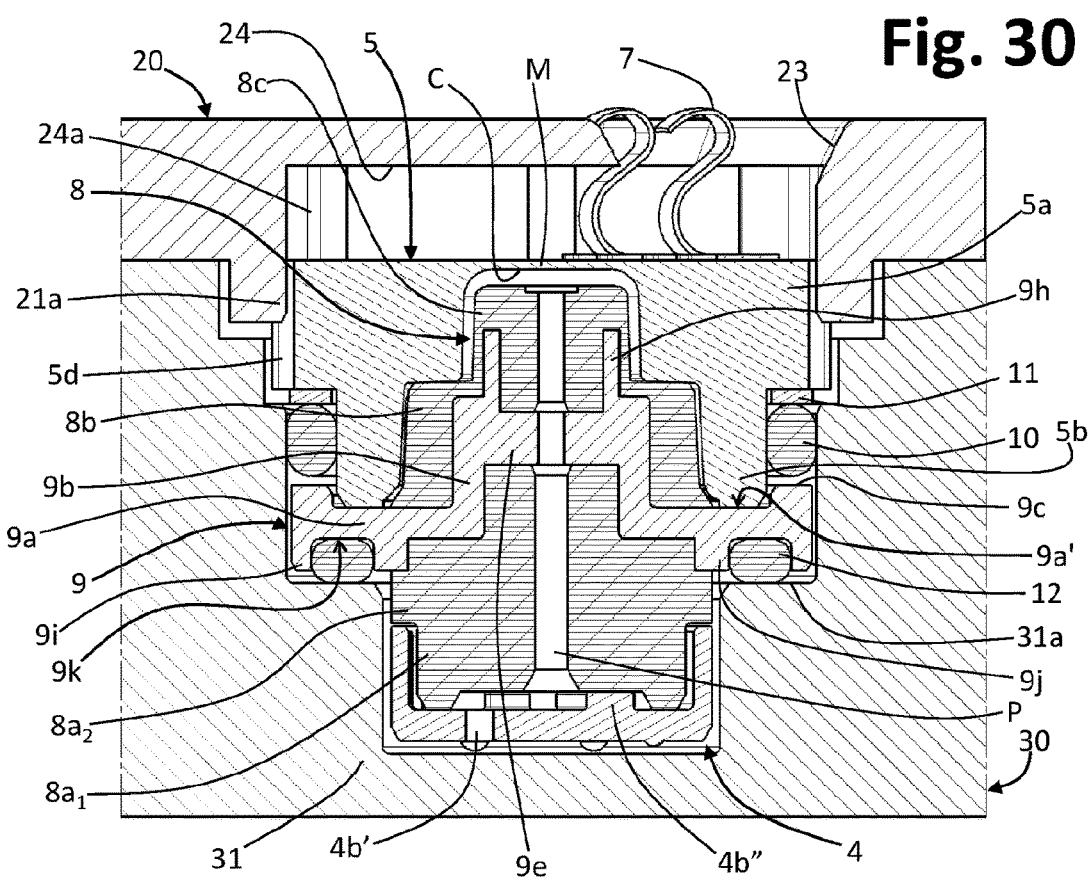
FIGS. 30 and 31 are partial cross-sectional views, according to mutually orthogonal planes, of a pressure-sensor device comprising a sensor assembly of the type illustrated in FIGS. 19-20 and two casing parts according to possible embodiments.
Figure 31:
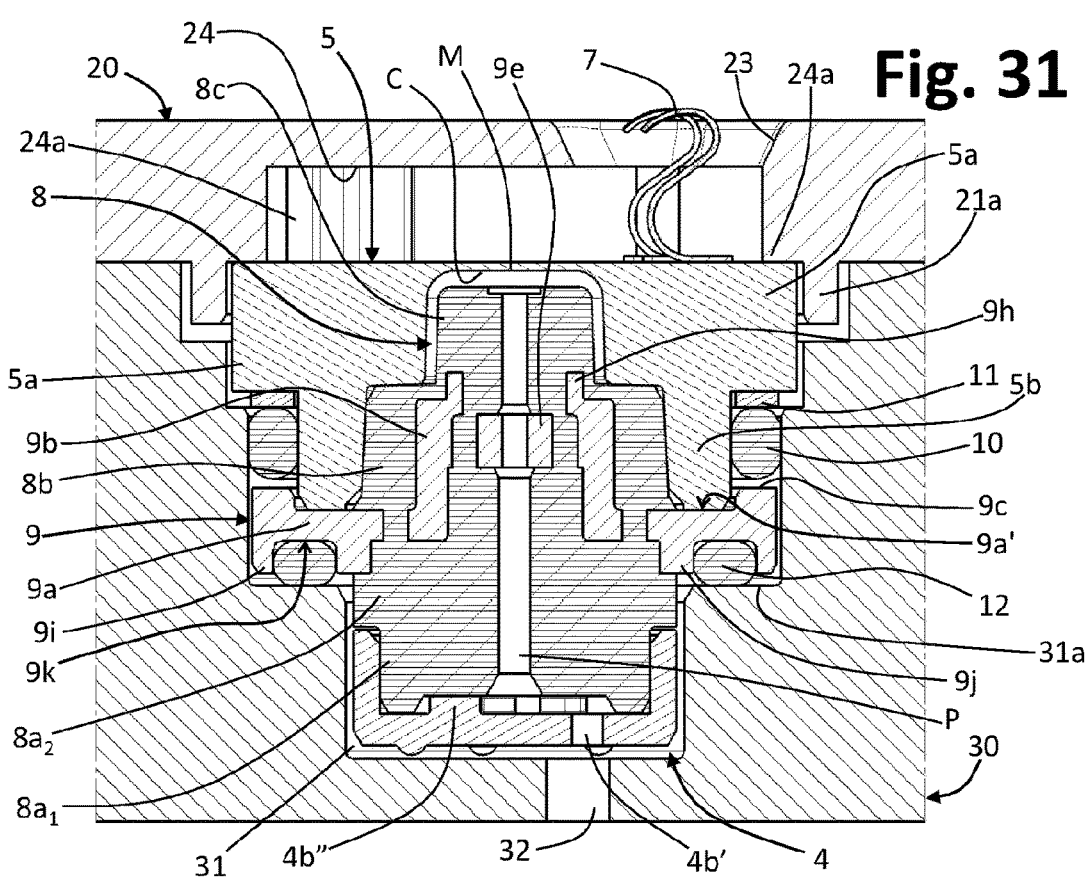

FIGS. 30 and 31 illustrate, via views similar to those of FIGS. 17-18, a device according to the invention basically comprising a sensor assembly according to FIGS. 19-27 mounted within a structure that includes a closing body and a housing body, of the same type as those already designated above by 20 and 30, respectively. As may be noted, the device illustrated is similar to the one already described above, with the differences represented by the type of construction and installation of the shielding element 4 (and hence with the different portions 8*a*₁ and 8*a*₂ of the compressible body 8), and the modified shape of the main disk part 9*c* of the core 9 of the compensation element, with the corresponding seat 9*k* for the annular element 12, with the latter resting on the step 31*a* of the housing 31.

Figure 32:
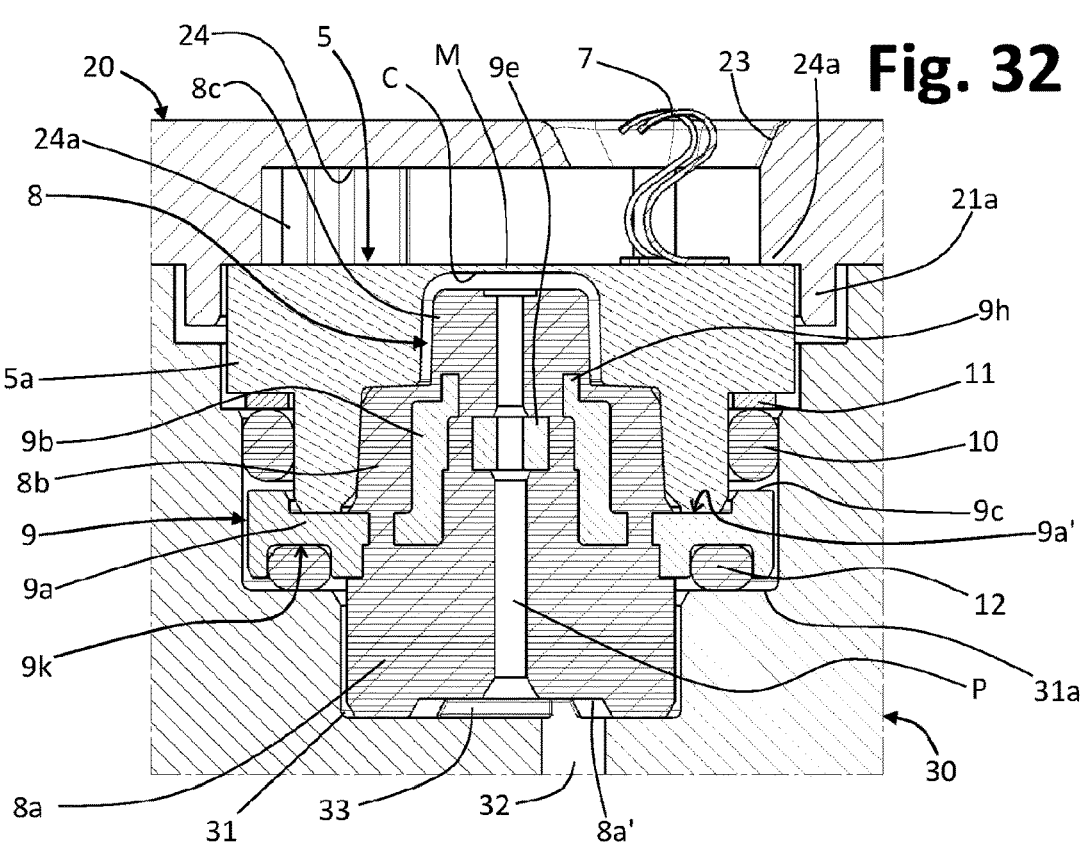
FIG. 32 is a cross-sectional view similar to that of FIG. 31, regarding a possible variant embodiment.

As has been said, the shielding element 4 constitutes an optional element of a sensor assembly 1 or of a device according to the invention. For instance, FIG. 32 illustrates schematically, with a cross-sectional view similar to that of FIG. 31, a variant in which the use of the aforesaid element 4 is not envisaged. In various embodiments of this type, the deformable body 8 of the compensation element 3 has a part 8*a* that is sized so as to rest directly on the bottom surface of the seat 31 of the body 30. In these embodiments, the part 8*a* of the compensation element 3 may possibly also perform the function of elastic support.

In this way, even in the absence of the annular element 12, the sensor body 5 and the compensation element associated thereto would in any case be mounted in an elastic way within the seat 31, in a way similar to what has been described previously. Preferentially, the part 8*a* of the deformable body 8 has in any case at its distal end the recess 8*a*', the bottom of which can rest on one or more reliefs 33 defined on the bottom surface of the housing 31 in order to guarantee also in this case the presence of a chamber or passage between the seat 31 and the deformable body 8, i.e., guarantee fluid communication between the inlet passage 32, preferably set in a staggered or lateral position, and the central passage P of the compensation element 3.

The elastically compressible or deformable body of a compensation element provided according to the invention does not have to be necessarily overmoulded on the respective core. FIGS. 33-39 illustrate for this purpose possible embodiments in which at least one such compressible or deformable body is elastically coupled to a corresponding core.

Figures 33, 34:
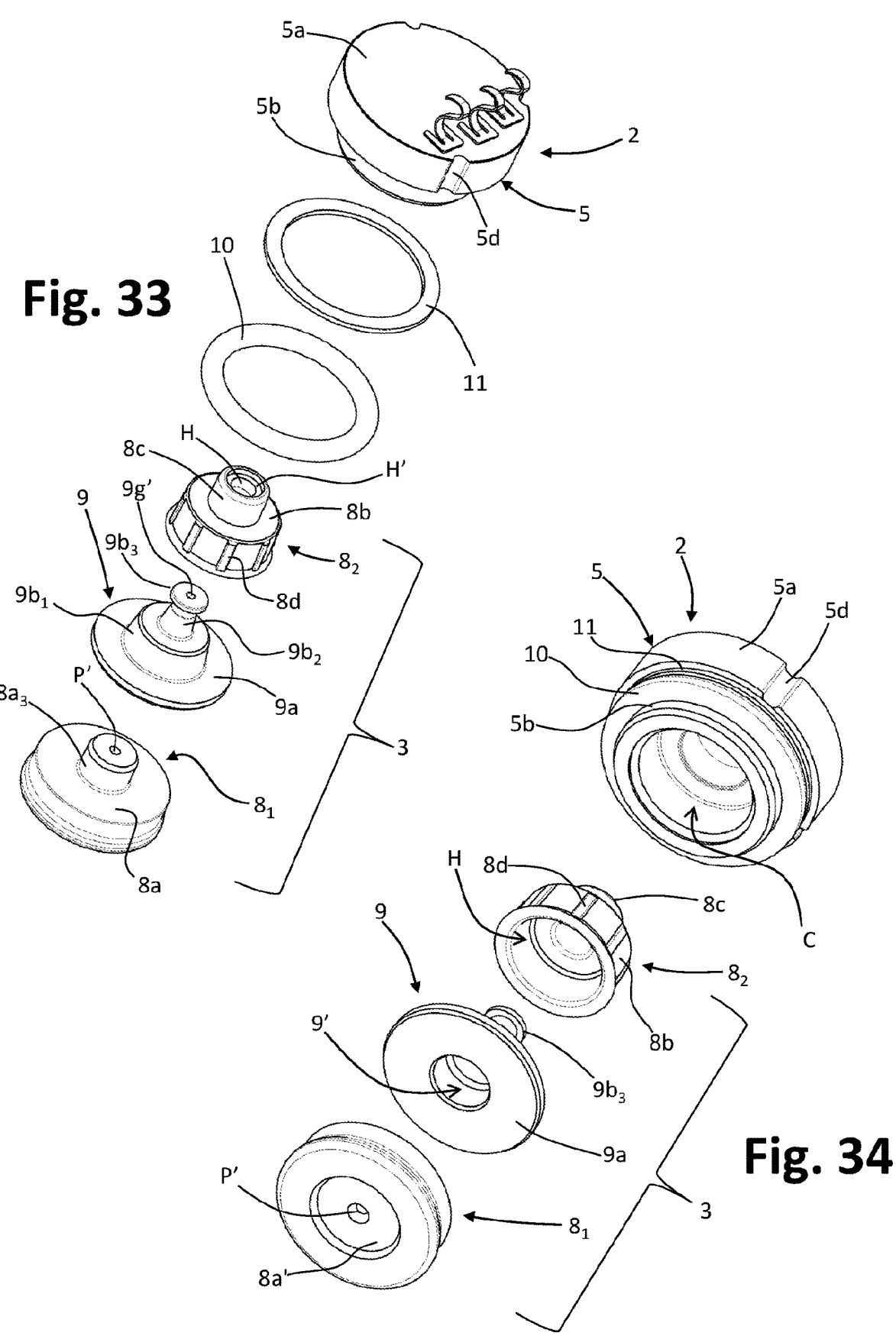
FIGS. 33 and 34 are exploded views of a sensor assembly according to further possible embodiments.

With initial reference to FIGS. 33-34, in the case exemplified the compensation element 3 includes a core 9, coupled in an elastic way to which are two elastically compressible or deformable bodies, designated by $8_1$ and $8_2$, respectively. Also in this embodiment, the core 9 includes a main part, substantially disk-shaped or flange-shaped 9a, from the upper face of which there rises a shaped tubular portion, preferably including a plurality of stretches of different diameter, such as those designated by $9b_1$ and $9b_2$, where the tubular stretch $9b_1$ has a maximum diameter greater than that of the tubular stretch $9b_2$, the latter extending from the top of the former. Preferably, provided at the top of the stretch $9b_2$ is a further stretch, or head, designated by $9b_3$, the maximum diameter of which is greater than that of the intermediate stretch $9b_2$. Preferably, at least the stretches $9b_1$ and $9b_2$ have a peripheral profile at least in part flared or frustoconical, even though this is not an essential characteristic. The tubular portion formed by the aforesaid stretches $9b_1$, $9b_2$ and $9b_3$ comprises an axial cavity 9', peripherally delimited by the tubular stretch $9b_1$, whilst the intermediate tubular stretch $9b_2$ and the head $9b_3$ are traversed by a through hole 9g' (see also FIG. 39).

Preferentially, the compressible body $8_1$ has a generally disk-shaped or cap-shaped main part, functionally similar to the body part 8a of the embodiments described previously, from which there rises an upper projection $8a_3$. The body $8_1$ likewise has a central through hole, designated by P'. As may be appreciated from FIGS. 33-34 and as may be noted in FIG. 39, the upper projection $8a_3$ of the body $8_1$ is designed to be engaged, preferably with elastic interference, within the cavity 9' peripherally delimited by the tubular stretch $9b_1$. Hence, in other words, the projection $8a_3$ can be withheld elastically inside the aforesaid cavity. More in general, in various embodiments, the body $8_1$ of the compensation element 3, in particular the upper projection $8a_3$, may be provided with means for positioning and/or coupling with respect to the core 9.

On the other hand, the deformable body $8_2$ substantially defines two body parts functionally similar to the ones designated previously by 8b and 8c, the part 8b being preferably provided with the corresponding axial reliefs 8d, as may be clearly noted in FIGS. 33-34. From FIG. 34, as well as from FIG. 39, it may be noted how the body $8_2$ is axially traversed by a corresponding cavity, designated by H, defined by a shaped surface having a profile substantially corresponding to the outer profile of the stretches $9b_1$, $9b_2$ and $9b_3$ of the core 9, possibly with slightly smaller peripheral dimensions. In this way, as may be appreciated from FIG. 39, the cavity H of the body $8_2$ can be elastically fitted on the tubular stretches $9b_1$, $9b_2$, and $9b_3$, with the terminal stretch $9b_3$ that guarantees relative positioning between the two coupled parts. For this purpose, preferably the terminal portion of the cavity H, designated by H' only in FIG. 33, is shaped and sized for housing the tubular terminal stretch or head $9b_3$ of the core 9.

Hence, in various embodiments, the body $8_2$ of the compensation element 3, in particular at least part of the corresponding cavity H, may be provided with means for positioning and/or coupling with respect to the core 9; likewise, preferably, at least part of the core 9, such as the terminal stretch $9b_3$, may be provided with positioning and/or coupling means with respect to the body $8_2$.

Figure 39:
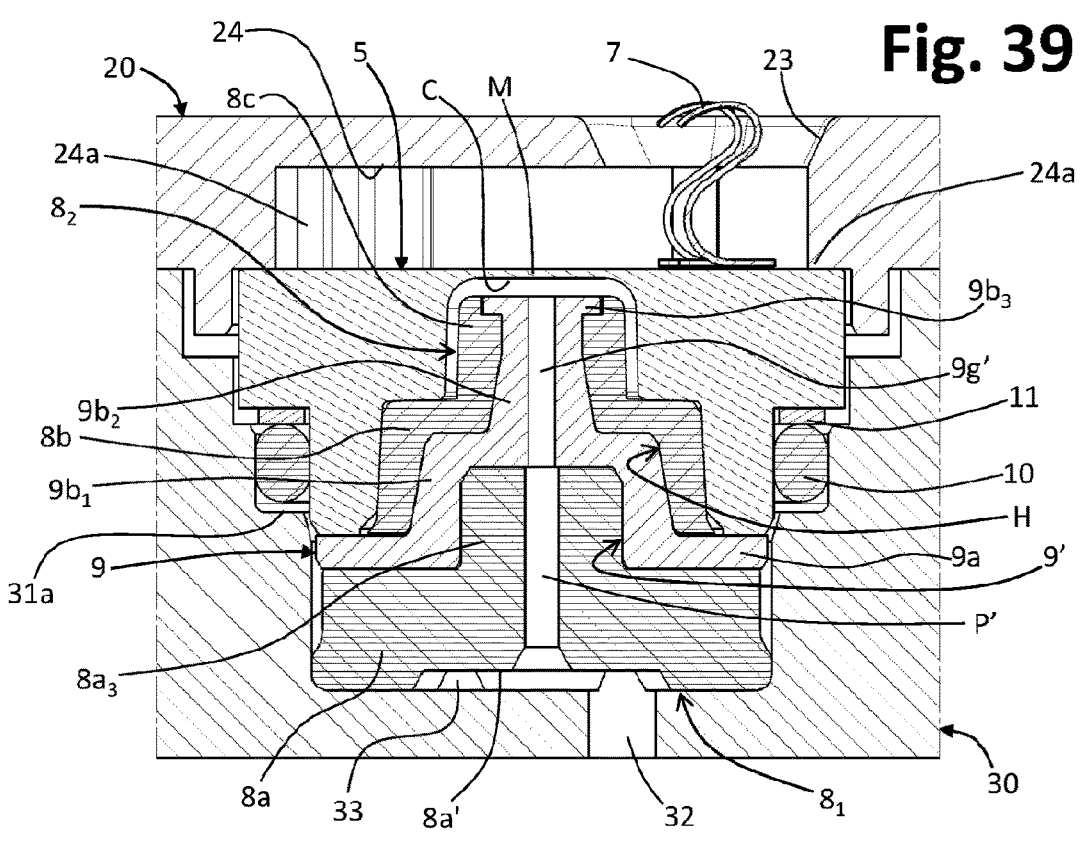
FIG. 39 is a partial cross-sectional view of a pressure-sensor device of the type illustrated in FIG. 38.

From FIG. 39 it may be noted how, in the assembled condition of the compensation element, the through hole P' of the body $8_1$ is axially aligned to the through hole 9g' of the core 9.

Figures 35, 36, 37:
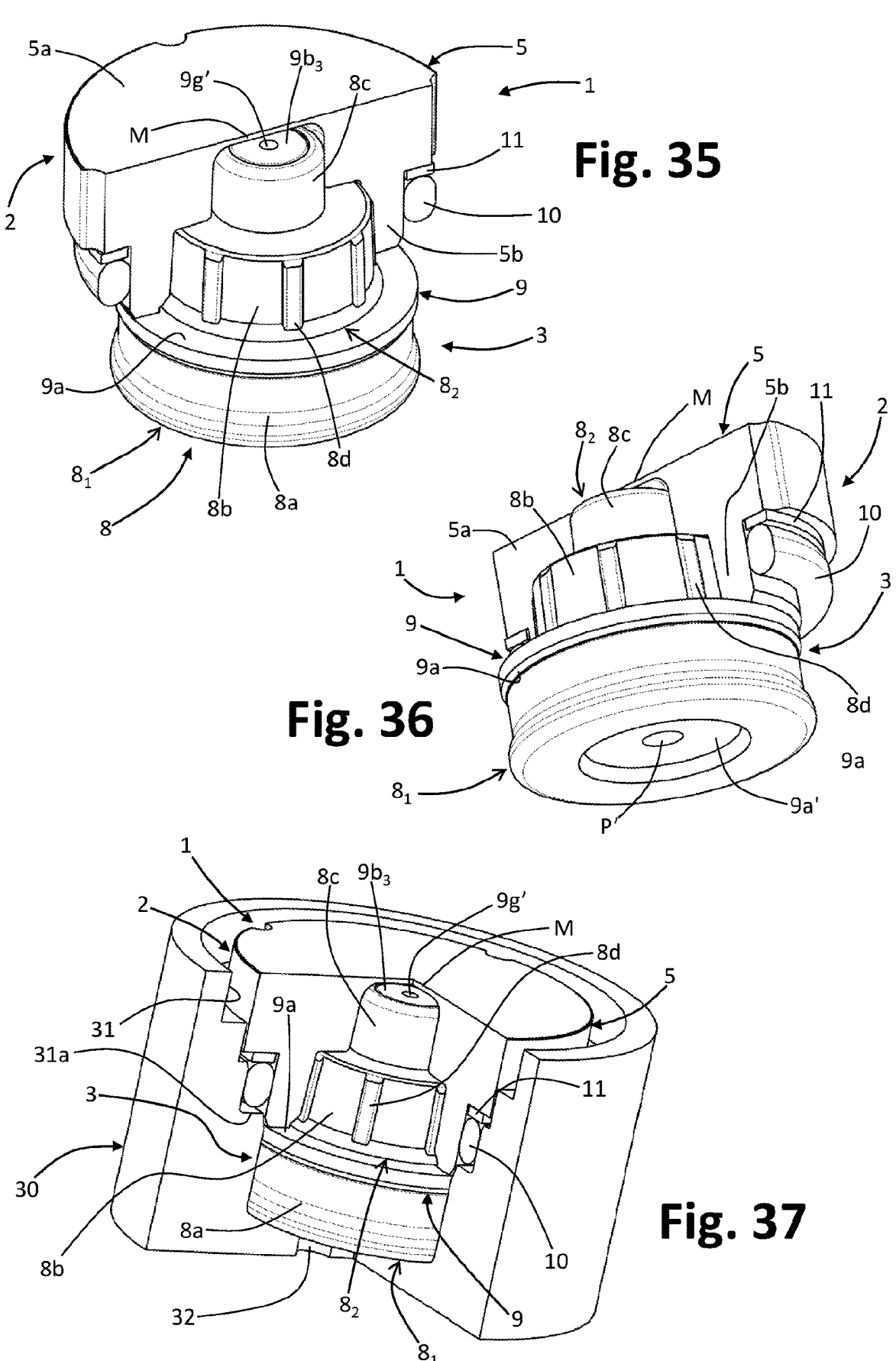
FIGS. 35 and 36 are sectioned perspective views of a sensor assembly of the type illustrated in FIGS. 33-34.
FIG. 37 is a sectioned perspective view of a pressure-sensor device with a sensor assembly of the type illustrated in FIGS. 35-36, and a casing part, according to possible embodiments.

The assembled condition of the compensation element 3, with the sensor 2 coupled thereto, is illustrated in FIGS. 35 and 36: as for the previous embodiments, the compensation element 3 may be coupled to the cavity of the sensor body 5, in particular in an elastic way, by exploiting at least the presence of the axial reliefs 8d of the portion 8b of the deformable body $8_2$. From the above figures it may be noted how, also in this case, the distal end of the portion 5b of the sensor body 5 can be set resting on the upper face of the disk portion 9a of the core 9. In the embodiment illustrated, the upper face of the portion 9a is not provided with an edge in relief, which, however, could be provided in other embodiments (not illustrated).

Figure 38:
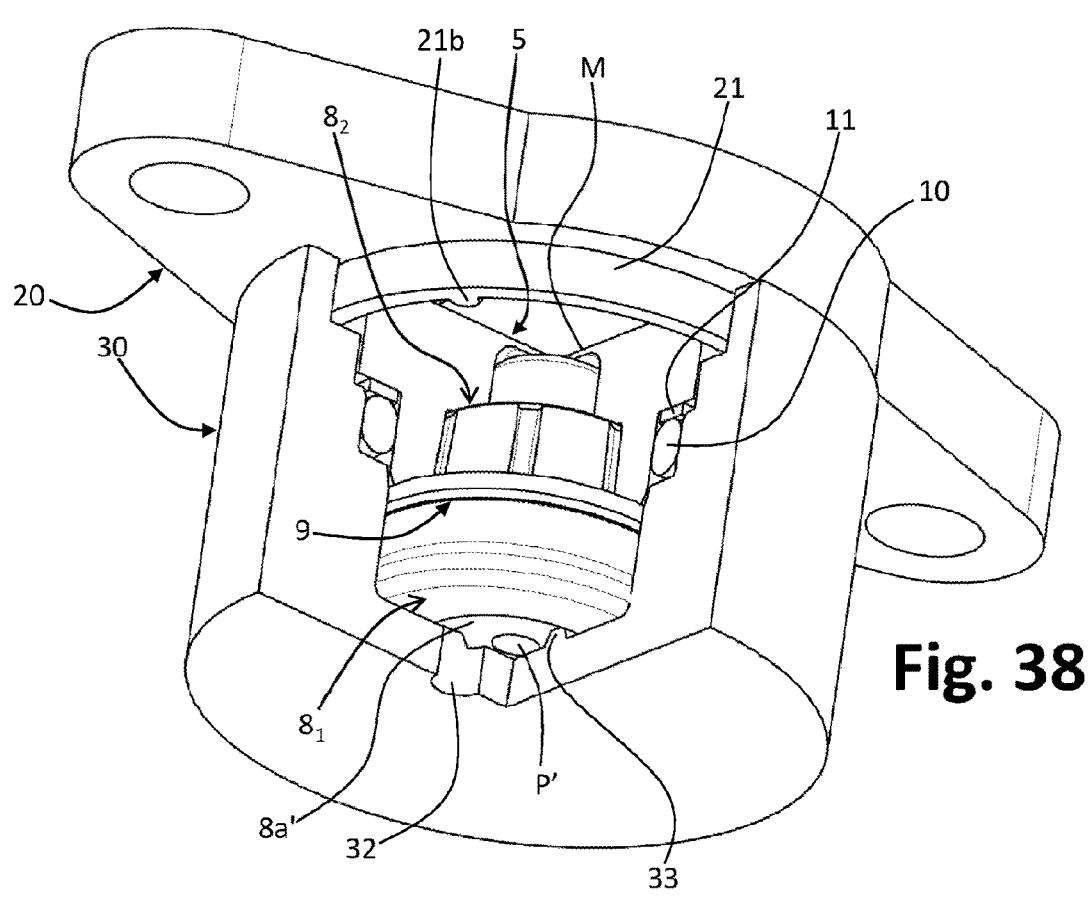
FIG. 38 is a sectioned perspective view of a pressure-sensor device with a sensor assembly of the type illustrated in FIGS. 35-36, and two casing parts, according to possible embodiments.

FIG. 37 exemplifies installation of the sensor assembly 1 of FIGS. 35-36 in the seat 31 of a housing body substantially similar to the ones designated previously by 30, whereas in FIGS. 38 and 39 the same assembly 1 is illustrated in the condition mounted between such a housing body 30 and a closing body substantially similar to those designated previously by 20. From these figures, it may be noted how installation is substantially similar to some of the other embodiments already been described previously. It should, however, be noted that, in embodiments of this type, the presence of an elastic supporting element of the same type as the ones designated previously by 12 is not indispensable. In this case, the portion 8a of the deformable body $8_1$ of the compensation element is sized so as to rest directly on the bottom surface of the seat 31 of the body 30. Also in this case, preferably, the portion 8a has at its distal end the recess 8a', the bottom of which can rest on reliefs 33 defined on the bottom surface of the housing 31 in order to guarantee fluid communication between the inlet passage 32 of the body 30 and the central passage P' of the deformable body $8_1$, which is axially aligned to the passage 9g' of the core 9.

Also in embodiments of this type, the seat 31 of the housing body 30 may include at least one intermediate step 31a, which in this case is in a position substantially corresponding to that of the sealing element 10. It should be noted that, in the condition exemplified in FIGS. 38-39, the sealing element 10 is at a certain distance from the aforesaid step 31a, but this does not constitute an essential characteristic in so far as the components could be sized in such a way that the aforesaid element 10 is set resting on the step 31a. In the condition of resting of the sealing element 10 on the step 31a and on the ring 11, the sealing element 10 could possibly operate also as elastic supporting element.

Of course, the solution of providing at least one compensation body fixed to the corresponding core, preferably in an elastic way, of a conception similar to the body $8_1$ and/or the body $8_2$, may be applied also to the other embodiments described herein. Moreover, in the case exemplified in FIGS. 33-39, the sensor assembly 1 is without the annular element 12 and the shielding element 4, but obviously at least one of these elements could be provided, if so required.

FIGS. 40-45 illustrate a variant embodiment substantially similar to that of FIGS. 33-39, where, however, the compressible body of the compensation element is overmoulded on the corresponding core.

As may be noted, the general outer shape of the compensation element 3, and hence of the assembly 1, is substantially similar to the one illustrated in FIGS. 35-36, apart from a slightly modified peripheral profile of the part 8*a* of the compressible body. In this embodiment, as has been said, the body 8 is overmoulded on the core, and for this purpose, as may be seen in particular in FIGS. 42 and 43, the core 9 may include the corresponding central tubular part 9*b*, possibly provided at the top with the crenellation 9*h* and provided, on the inside of the transverse wall 9*e*, with the corresponding peripheral openings 9*f* and central hole 9*g*; likewise, also the flange part 9*a* of the core 9 may envisage the corresponding through openings 9*d*.

Figures 40, 41, 42:
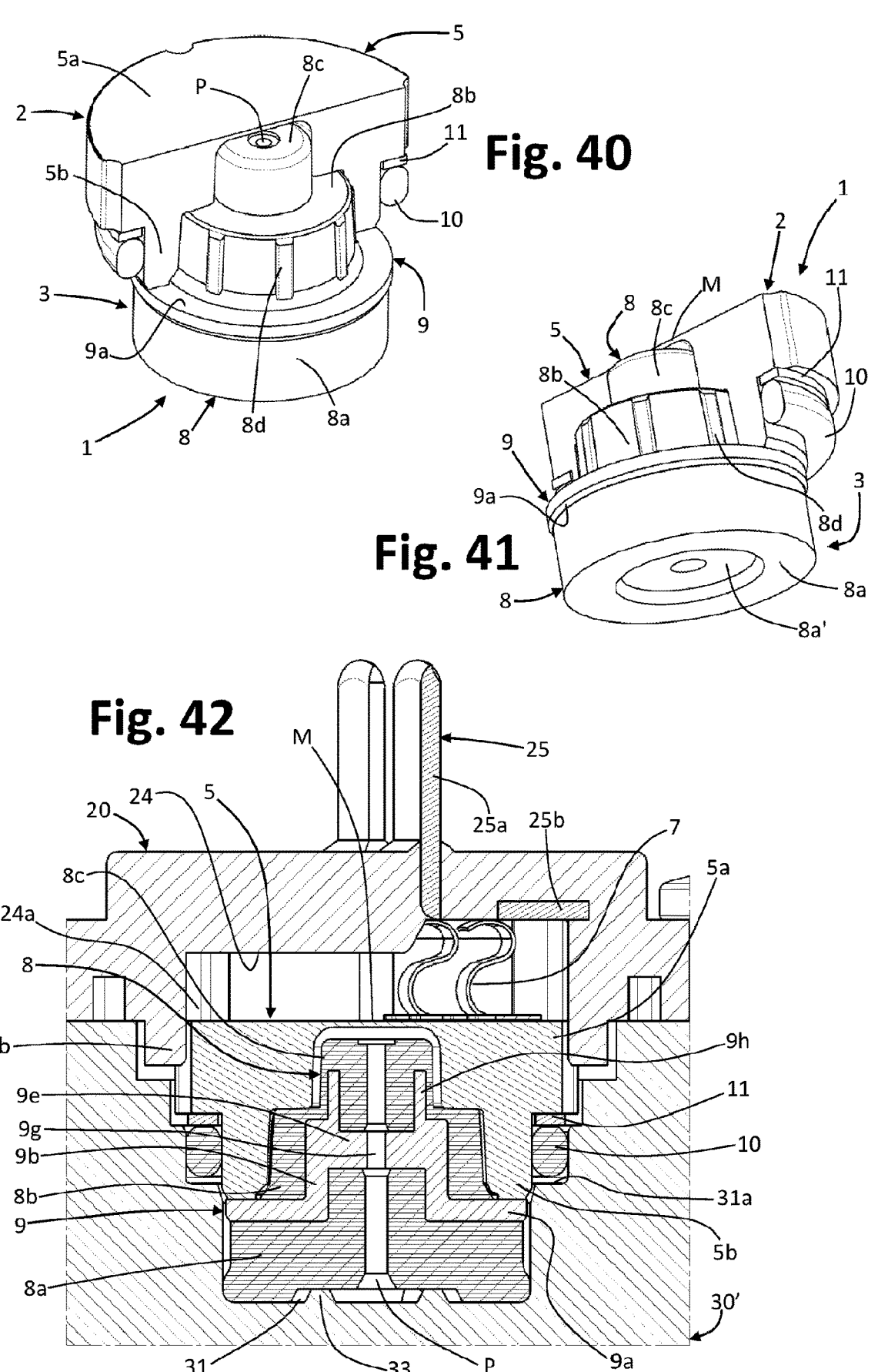

FIGS. 42 and 43 are designed to illustrate how, in possible variant embodiments, the closing body 20 of a sensor device according to the invention may include electrical terminals that are designed to come into electrical contact with the elastic contacts 7 associated to the sensor body 5. In the example, each electrical terminal, one of which is designated by 25, includes a part 25*a* that extends on the outside of the body 20, and a part 25*b* having a surface facing the inside of the cavity 24, elastically resting on which is the end of a respective elastic contact 7 of the pressure sensor; as an alternative, the elastic contacts 7 could be replaced by electrical wires soldered between purposely provided pads of the sensor body 5 and the electrical terminals 25.

As mentioned previously, a sensor assembly according to the invention may be mounted within a corresponding seat defined by a different functional component, for example a pump for the fluid, or a hydraulic device comprising a hydraulic pump, or else any other device or hydraulic or pneumatic apparatus, in particular for vehicles, that require the presence of a pressure sensor.

Figures 45, 46, 47:
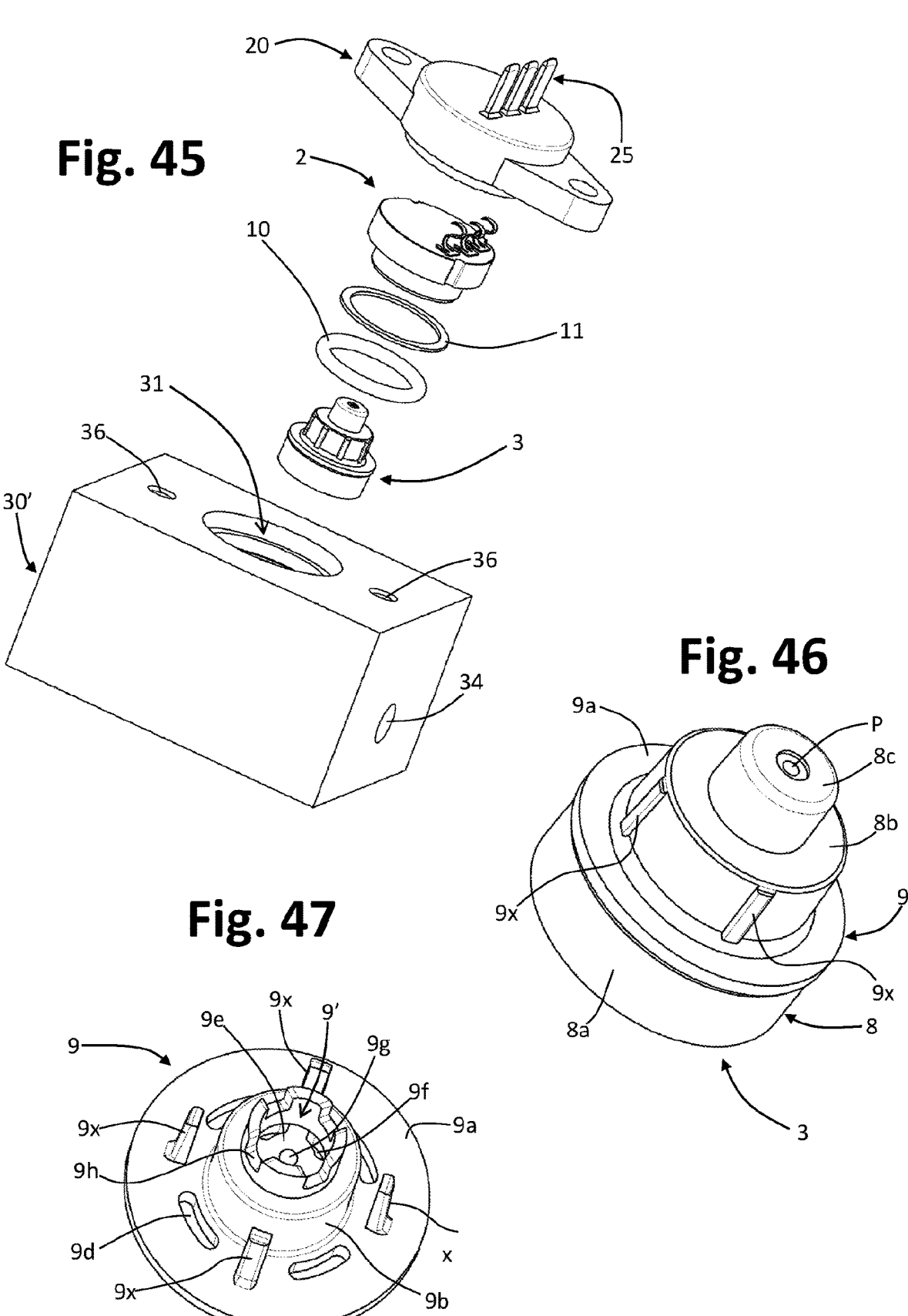

FIGS. 42 and 43 are likewise designed to illustrate such a case, where the aforesaid different functional component is designated by 30'. With reference also to FIGS. 44-45, in the aforesaid component 30', represented schematically, a seat of the type designated previously by 31 is defined, the inlet 32 of which is connected to a duct for passage of the fluid 34, for example a delivery of the fluid. In the example, the sensor assembly 1 is mounted within the seat 31 and is held in position via a closing body of the type designated previously by 20, which is, for example, fixed to the component 30' via screws 35 engaged in corresponding threaded holes 36 of the component itself.

Of course, what has been described with reference to the construction of the body 20, provided with the terminals 25, and to mounting thereof in relation to a different functional component of the type designated by 30' applies also to all the other embodiments here described. In FIGS. 40-45, the sensor assembly 1 is without the annular element 12 and the shielding element 4, but obviously at least one of these elements could be provided, if so required.

In various embodiments, the compensation element 3 may be coupled in an elastic way to the sensor body 5 by exploiting the shape of the core 9, instead of the elastically deformable body 8, as in the embodiments described previously. An example of this sort is illustrated in FIGS. 46-50.

As in various previous embodiments, the element 3 comprises a core 9, fixed, for example overmoulded, on which is the body 8. Of course it is also possible to envisage elastic mounting of at least one deformable body 8 on the core 9, for example a body of a conception similar to the bodies 8₁ and 8₂ described previously.

In the case illustrated, and as may be seen in particular in FIG. 47, the core 9 further defines a plurality of positioning and/or fixing elements, for example constituted by axial appendages, which are at least in part elastically flexible, designated by 9*x*, which rise from the flange portion 9*a* of the core itself. In the example illustrated, the appendages 9*x* rise from the upper face of the portion 9*a* and are arranged substantially according to a circumference, for example but not necessarily interspersed with the openings 9*d*, in particular a circumference substantially concentric with respect to the tubular portion 9*b*, i.e., in a position peripheral with respect thereto.

The elastically deformable body 8 is overmoulded on the core 9 with modalities similar to the ones already described previously, but so that at least the outer side of the appendages 9*x* (with respect to the tubular portion 9*b*) is at least partially exposed at the peripheral profile of the body 8, in particular of at least the part 8*b*. This type of embodiment is clearly visible in FIG. 46, where it may in fact be noted how the appendages 9*x* are arranged substantially according to the circumference of the part 8*b* of the body 8, and how a part of each appendage 9*x* projects in a radial direction with respect to the peripheral surface of the part 8*b*.

In an embodiment of this sort, it is not necessary for the peripheral profile of the body part 8*b* to be provided with the axial reliefs designated previously by 8*d* in so far as their function is basically performed by the exposed part of the appendages 9*x*.

Figures 48, 49:
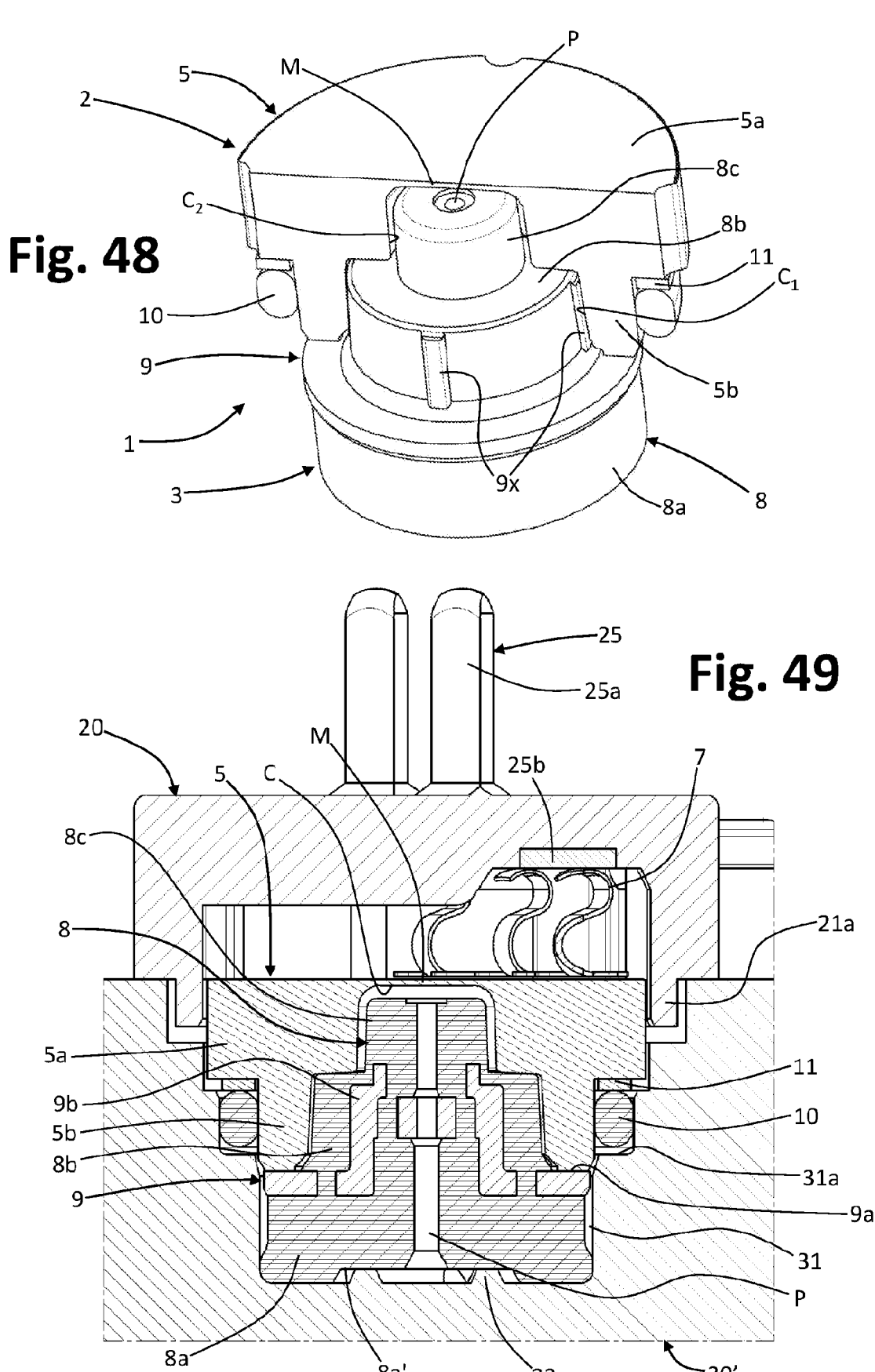
FIG. 48 is a sectioned perspective view of a sensor assembly comprising a compensation element of the type illustrated in FIG. 46.
FIGS. 49 and 50 are partial cross-sectional views, according to mutually orthogonal planes, of a pressure-sensor device, comprising a sensor assembly of the type illustrated in FIG. 48, and a casing part, according to possible embodiments, mounted on a generic functional component.
Figure 50:
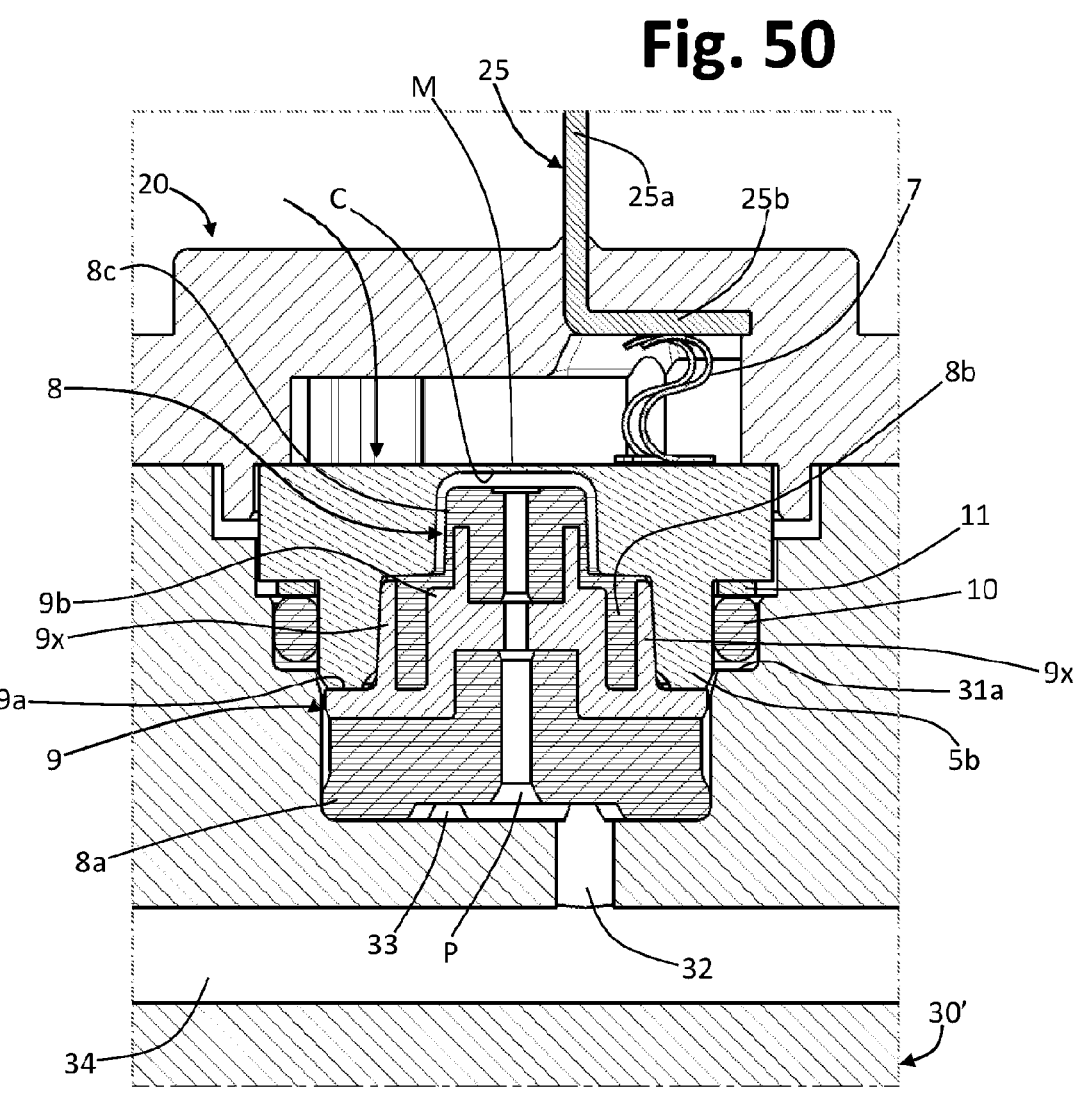

The concept is clearly visible in FIGS. 48 and 50, where it may be noted how, in the assembled condition between the sensor 2 and the compensation element 3, the outer side of the appendages 9*x* interferes with the inner surface of the cavity of the sensor body, in particular the surface that peripherally delimits the cavity portion $C_1$. Also in this case, the interference between the parts is basically elastic, thanks to the flexible nature of the appendages 9*x* and to the fact that, in any case, the material of the body 8 (i.e., of its part 8*b*) that is located behind the inner side of the appendages 9*x* themselves is elastically compressible or deformable. Also in this case, then, the appendages 9*x* and the deformable nature of the body 8 enable an insertion with slight interference of the portion 8*b*-8*c* of the body 8 within the cavity C of the sensor body 5, which is in any case sufficient to guarantee positioning and coupling of the former with respect to the latter, with the advantages already explained linked to the possibility of providing a self-standing or independent sensor assembly 1, which can be easily manipulated as a single unit.

The type of embodiment described with reference to FIGS. 46-50 may of course be applied also to the other embodiments. Also in the case exemplified in FIGS. 46-50, the sensor assembly 1 is without the annular element 12 and the shielding element 4, but at least one of these elements could be provided, if so required.

Figure 51:
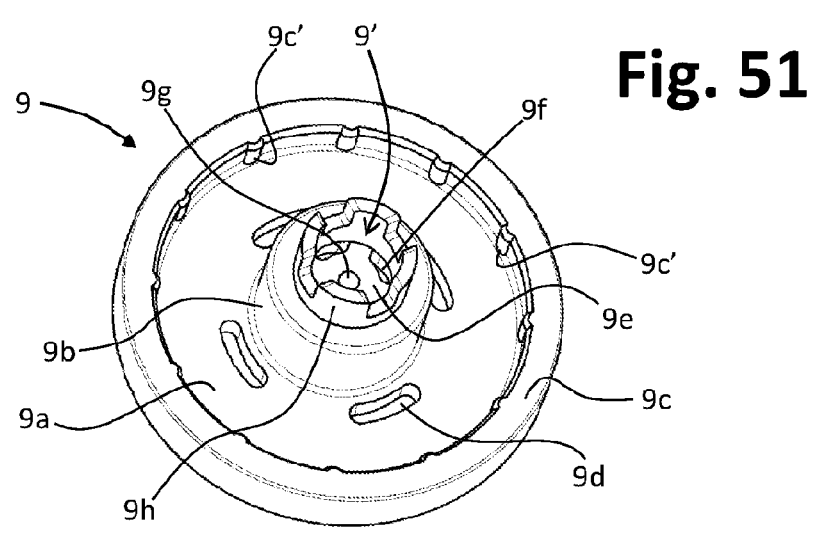
FIG. 51 is a perspective view of a core or reinforcement that can be used in a compensation element according to possible variant embodiments.

FIG. 51 illustrates a variant embodiment of the core 9 of a compensation element, according to which provided on the inner side of the peripheral edge 9*c* are axial reliefs or ribbings, some of which are designated by 9*c'*, which are able to co-operate with the outer surface of the tubular wall of the sensor body, in particular of its portion 5*b*.

Figure 52:
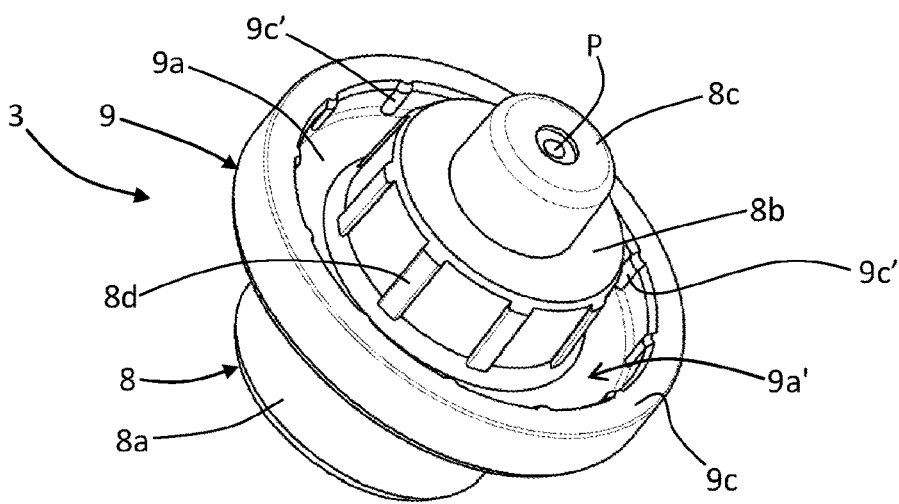
FIG. 52 is a perspective view of a compensation element comprising a core of the type illustrated in FIG. 51.

FIG. 52 illustrates a compensation element 3 comprising such a core 9, in the case of an overmoulded compressible body 8, where it may be noted how, basically, distributed along the inner circumference of the seat 9*a'* are the axial reliefs $8d$ of the body part $8b$, whereas distributed along the outer circumference of the same seat $9a'$ are the axial reliefs $9c'$.

Figure 53:
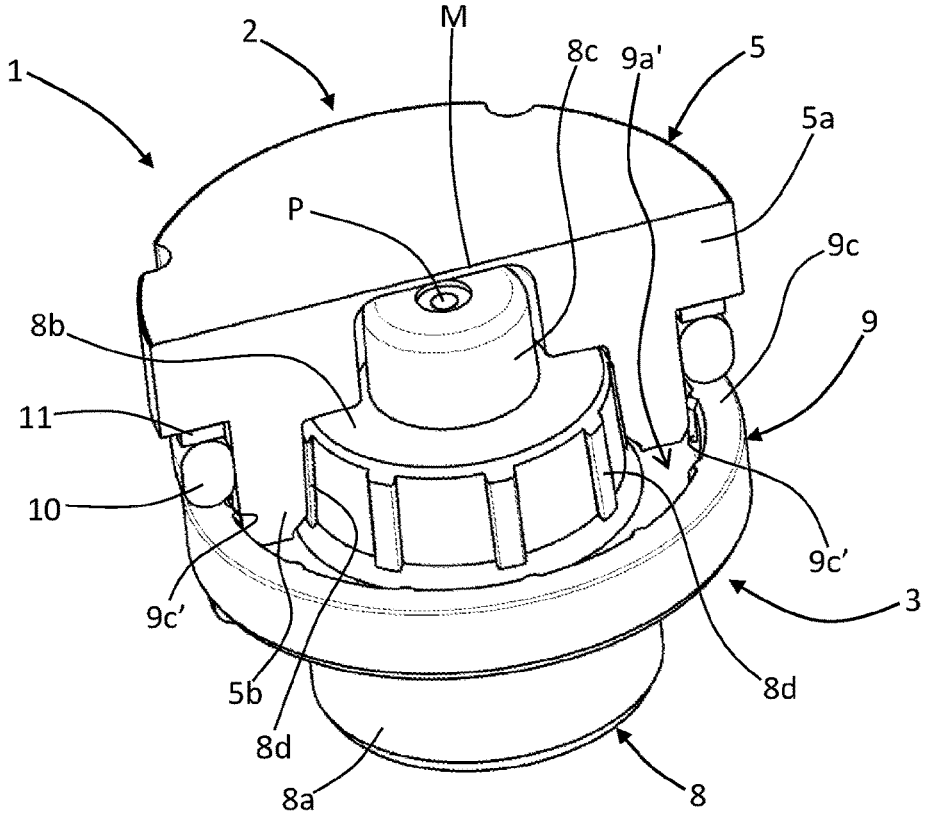
FIG. 53 is a sectioned perspective view of a sensor assembly comprising a compensation element of the type illustrated in FIG. 52.

The next FIG. 53 shows the assembled condition between sensor body 5 and compensation element 3, with the lower-end region of the body portion $5b$ inserted in the seat $9a'$, with the reliefs $8d$ of the body part $8b$ that interfere in an elastic way with the inner surface of the portion $5b$, whilst its outer side interferes in a relatively rigid way with the reliefs $9c'$. Such a type of embodiment may prove advantageous to improve further coupling between the sensor 2 and the compensation element 3, for the purposes of handling of the self-standing assembly 1. The reliefs $9c'$ may be provided in all those embodiments in which the core 9 includes an edge in relief of the type designated by $9c$.

In various embodiments, a device integrating a sensor assembly of the type described herein may include an annular element of the type designated previously by 12, which is mounted within the seat 31 of a body 30 or of a component 30', instead of directly on the sensor assembly (as, for example, in the embodiments represented in FIG. 1-18 or 19-32).

Figure 54:
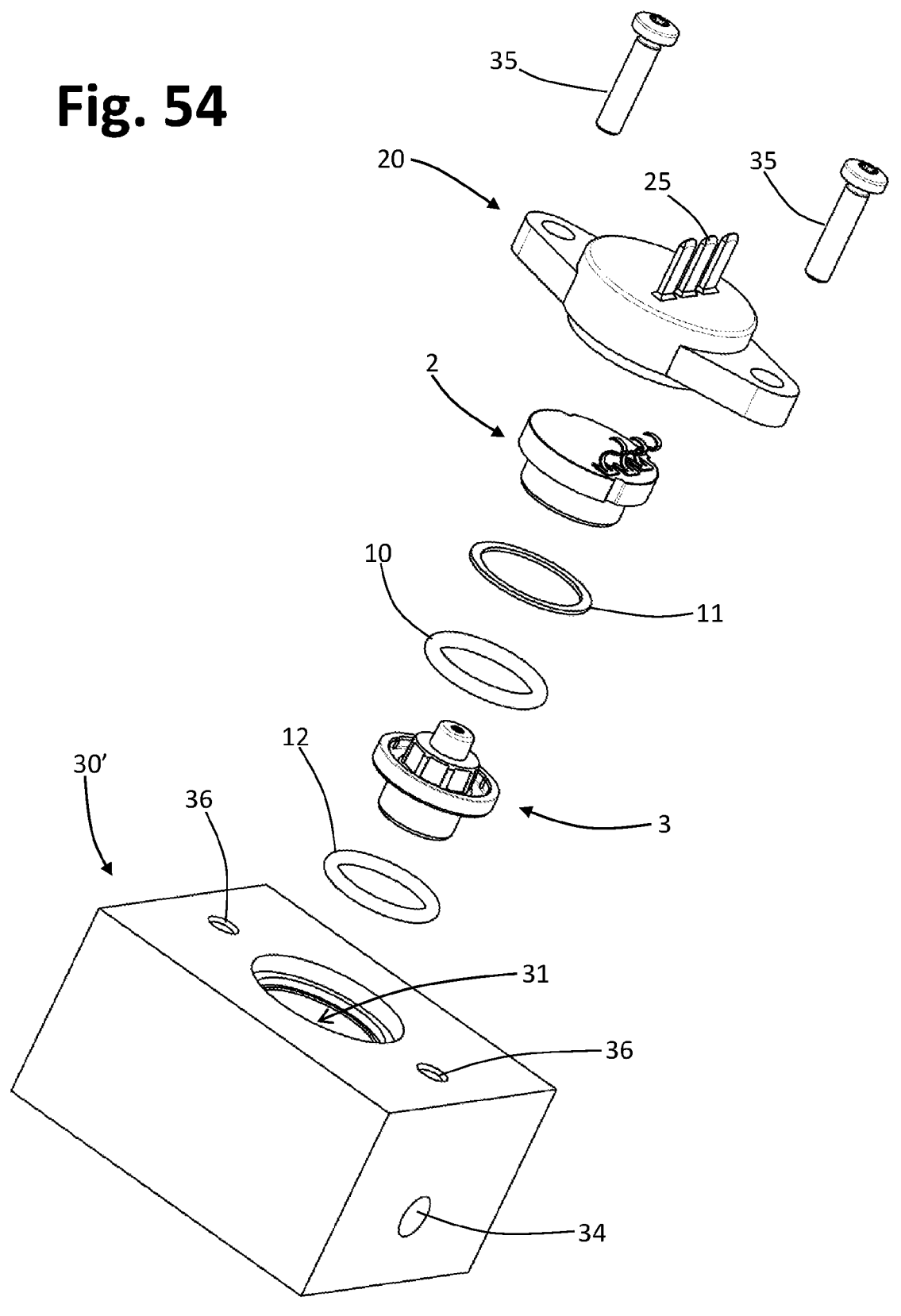
FIG. 54 is an exploded view of a pressure-sensor device according to further possible embodiments, which is designed to be installed on a generic functional component.
Figure 55:
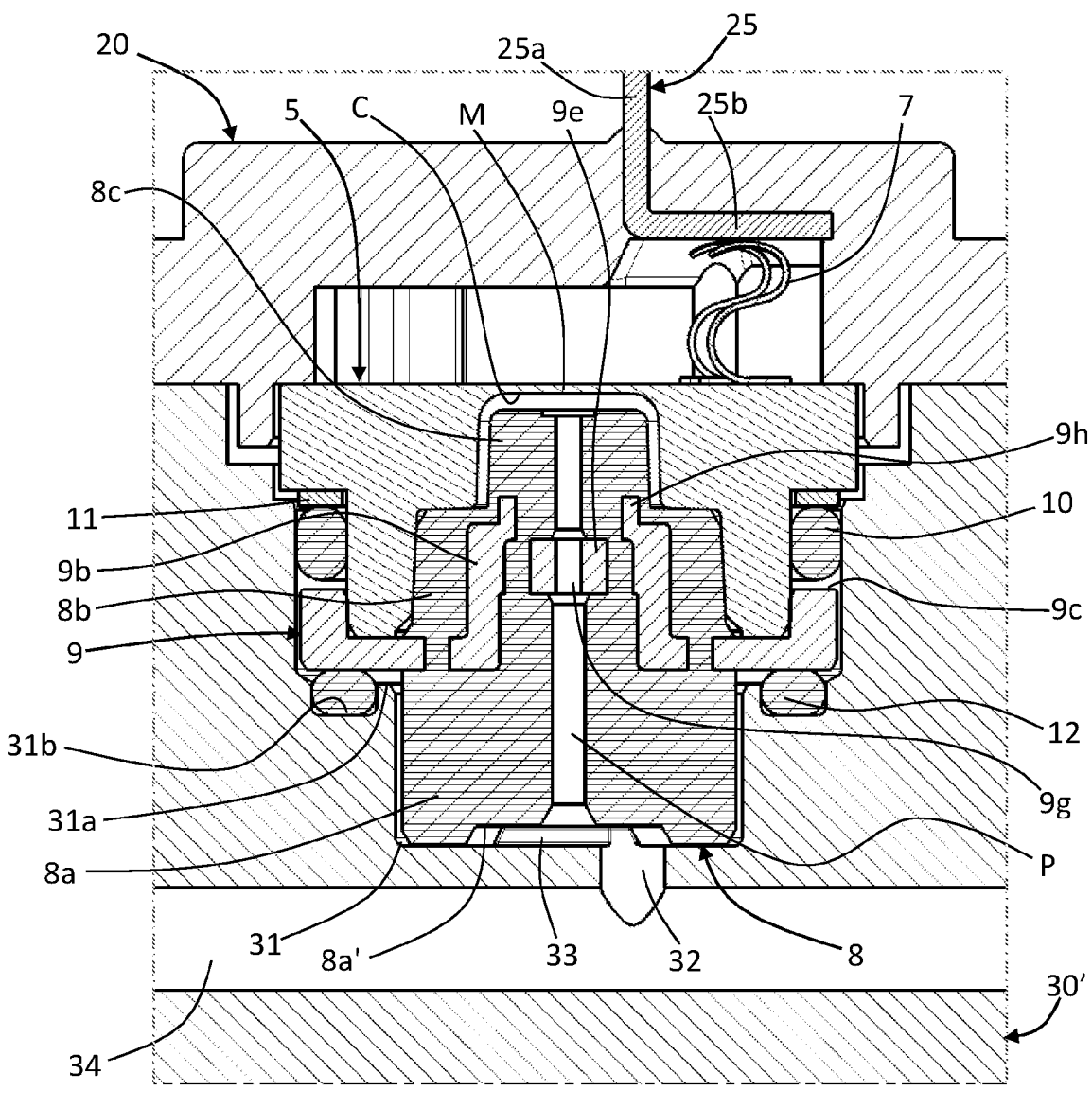
FIG. 55 is a partial cross-sectional view of the device and of the component of FIG. 54.

FIGS. 54-55 show schematically such a case, in relation to a generic functional component 30' (it being, however, understood that the same concepts can be applied also to the case of a casing body 30).

FIG. 54 shows schematically in exploded view the device, with parts 2, 3, 10, 12 and 20 substantially of a type already described previously. Also the component 30' can have a structure similar to the ones already exemplified previously, where, however, the peripheral profile of the seat 31 is modified. In particular, with reference to FIG. 55, it may be noted how, basically at the step $31a$, a seat $31b$ is defined for positioning of the annular supporting element 12, on which the lower face of the core 9 rests in order to guarantee elastic mounting of the sensor body and of the associated compensation element. As has been said, the presence of the element 12 may prove advantageous in those embodiments in which the sensor body and the compensation element are constantly urged into the seat 31, for example via the action of the elastic contact elements 7, as in the case exemplified in the figure. In the example illustrated, also the part $8a$ of the compressible body 8 rests on the bottom of the seat 31, but this does not constitute an essential characteristic, as already mentioned.

Figure 56:
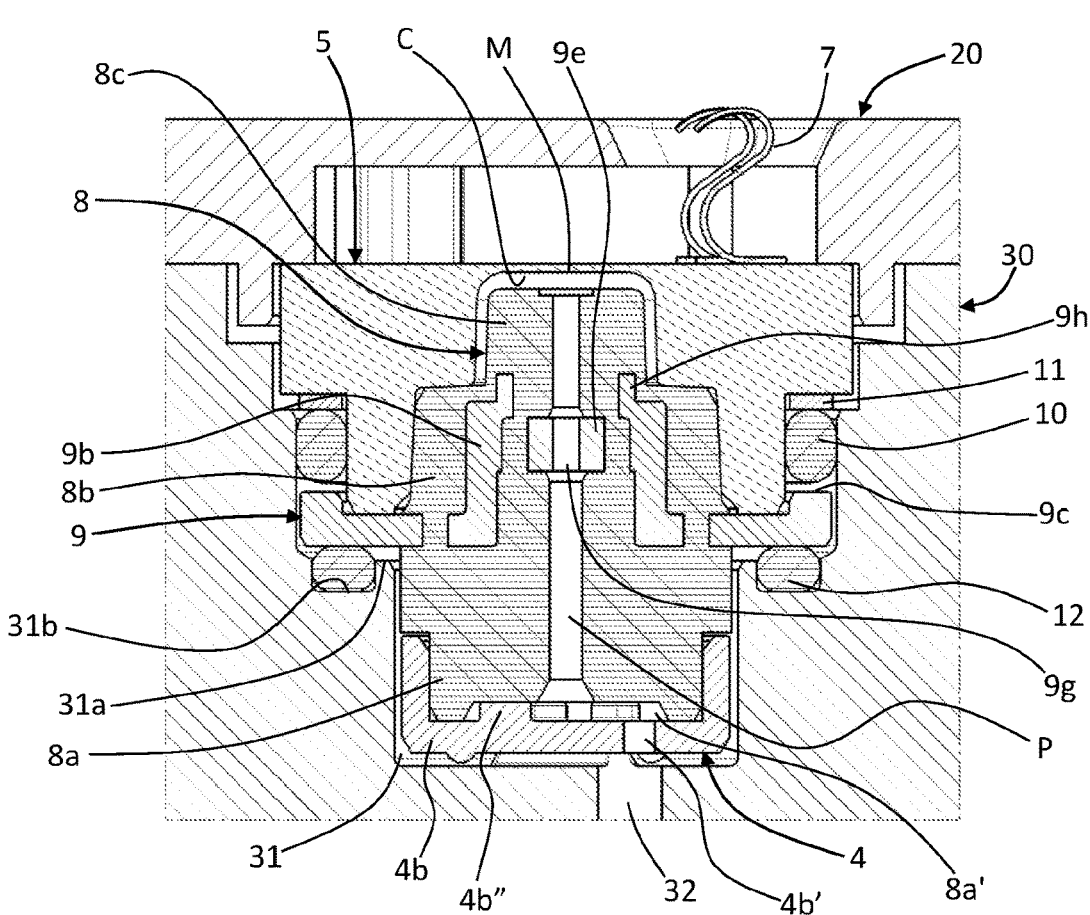
FIG. 56 is a cross-sectional view similar to that of FIG. 55, regarding to a possible variant embodiment.

FIG. 56 illustrates a similar case, but referring to a casing body 30, and where associated, preferably in an elastic way, to the body part $8a$ of the deformable body 8 is also a shielding element 4. The body part $8a$ and the shielding element 4 may, for example, be of type similar to the ones described with reference to FIGS. 19-31.

As already mentioned, in various embodiments, the bottom wall of a shielding element of the type described previously may envisage, on its outer side, one or more reliefs or projections, which are designed to rest on the bottom surface of the seat that is to receive the sensor assembly.

Figure 57:
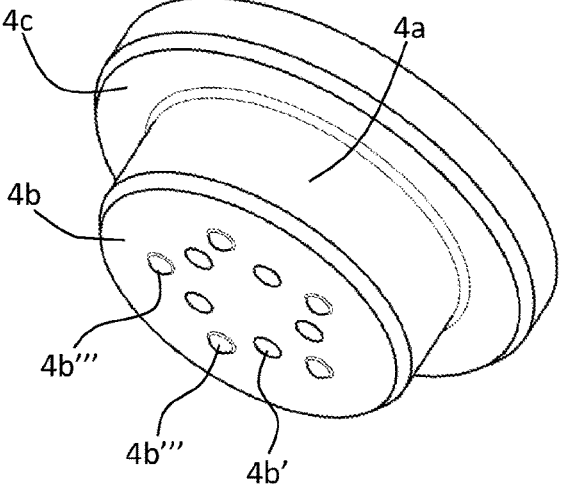
FIGS. 57 and 58 are perspective views of shielding elements for a sensor assembly according to possible embodiments.
Figure 58:
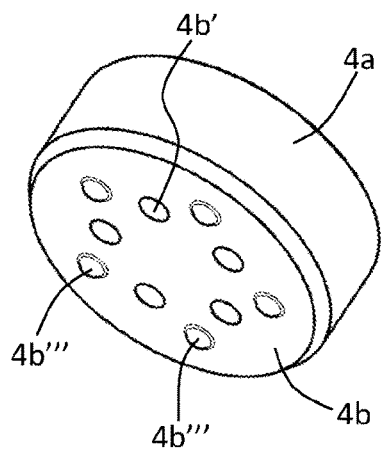
Figure 59:
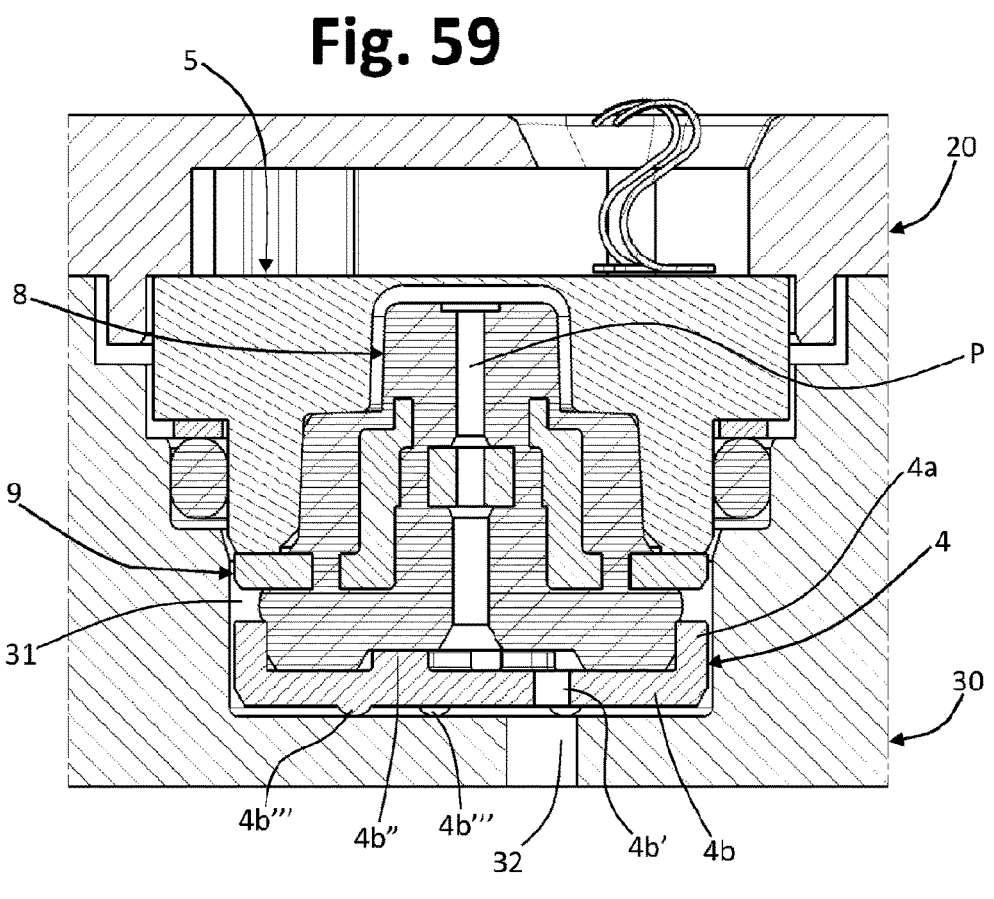
FIG. 59 is a partial cross-sectional view of a pressure-sensor device comprising a sensor assembly with a shielding element of the type illustrated in FIG. 58.

FIGS. 57 and 58 illustrate, for this purpose, two shielding elements 4, of the type represented in FIGS. 1-18 and FIGS. 19-31, respectively, the bottom wall $4b$ of which has on the outside a series of projections $4b'''$, here substantially in the form of embossings, for example arranged according to a circumference, for resting on the bottom of the seat 31. As may be appreciated from FIG. 59, the presence of the projections $4b'''$ prevents the bottom wall $4b$ from being completely in contact with the bottom surface of the seat 31, limiting the passage of the fluid through the inlet 32. Hence, in other words, the presence of the projections $4b'''$ guarantees in any case the presence of a free space through which the fluid that penetrates into in the seat 31 through the inlet 32 can reach the through openings $4b'$ present in the aforesaid wall $4b$.

Of course, the projections $4b'''$ may be envisaged in all the embodiments described herein, in particular to prevent the risk of an excessive thrust on the sensor assembly, for example by the elastic contacts 7, from exceeding the elastic resistance of the annular element 12 and/or of the part $8a$ of the deformable body 8, and thus from bringing about direct contact between the entire outer surface of the wall $4b$ and the bottom surface of the seat 31.

Figure 60:
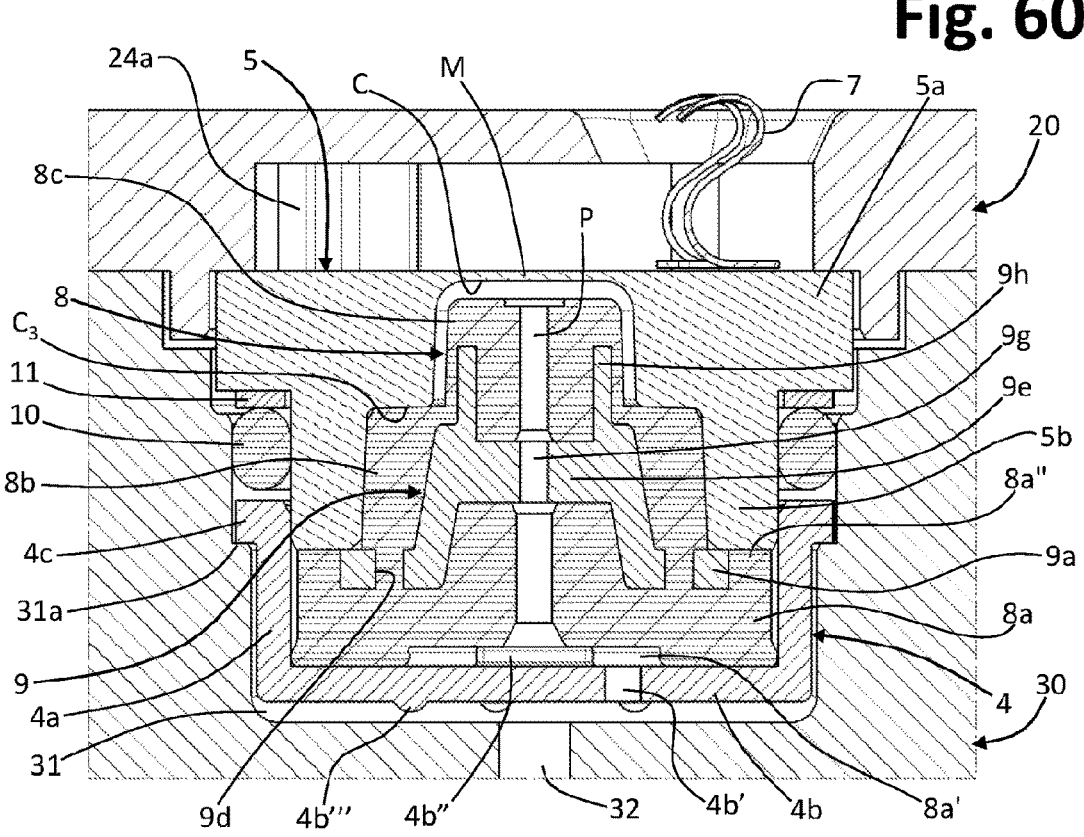
FIG. 60 is a partial cross-sectional view of a pressure-sensor device according to possible embodiments.

FIG. 60 illustrates further possible embodiments of the invention, in particular in relation to resting of the sensor body 5 on the core 9 of the compensation element and in relation to clastic mounting of the sensor body 5 and of the associated compensation element within a corresponding seat 31.

In the embodiments described previously, the body 8 or bodies $8_1$ and $8_2$, on the one hand, and the core 9, on the other hand, of a compensation element are structured substantially in such a way that the lateral dimension or maximum diameter of the core exceeds the lateral dimension or maximum diameter of the elastically compressible body 8. In this way, a peripheral part of the disk-shaped wall $9a$ of the core 9 can be exposed, to provide a resting surface for the lower end of the portion $5b$ of the sensor body; as has been seen, the peripheral part may be provided with the edge in relief $9c$ (see, for example, FIGS. 5-9 and 17-18) and/or with the edge in relief $9i$ (see, for example, FIGS. 27-31).

However, in various embodiments, for example of the type illustrated in FIG. 60, the core 9 may have a lateral dimension or maximum diameter smaller than the lateral dimension or maximum diameter of the elastically compressible body 8, and in particular of its body part $8a$, with the disk part $9a$ of the core that is to a major extent embedded in the corresponding elastically deformable material. As may be noted from FIG. 60, in embodiments of this type a small area of the upper face of the disk part $9a$ may in any case be exposed, and at least a corresponding area of the lower end of the portion $5b$ of the sensor body 5 can bear thereupon. Also this solution thus prevents the risk of the compensation element, in particular the parts $8b$ and $8c$ of its elastically deformable body 8, being inserted excessively within the cavity C of the sensor body 5 and possibly coming into contact with the membrane M.

In the embodiments described previously, the compensation element is mounted in an elastic way within the seat 31 by virtue of the presence of the annular element 12 or else of a body part $8a$ sized so as to rest directly on the bottom of the seat itself. In alternative embodiments, however, even in the presence of a shielding element 4 and in the absence of an annular element 12, the aforesaid elastic mounting may be obtained. In particular, in embodiments of this type, the shielding element 4 may be mounted resting directly within the seat (i.e., without interposition of some elastic element), and the same elastically deformable body 8 is exploited for the purposes of at least partial clastic mounting. FIG. 60 is designed to illustrate also such an embodiment, where it may be noted how the flange $4c$ of the shielding element 4 rests directly on the step $31a$ of the seat 31, i.e., in a substantially rigid way, and the lower part of the body 8, in particular its portion $8a$, rests on the wall $4b$ of the shielding element 4, guaranteeing clastic mounting of the sensor body 8 and of the associated compensation element 8-9.

In a further possible variant embodiment, the part of the body 8 that is designed to remain on the outside of the cavity C of the sensor body 5 may be provided so as to have at least one portion that projects further up than the upper surface of the disk part 9*a* of the core 9 and in such a way that on this projecting portion at least an area of the lower end of the portion 5*b* of the sensor body 5 can rest. Such a portion projecting in height of the body part 8*a* may correspond, for example, to the part designated by 8*a*" in FIG. 60, and may have an annular profile. This portion 8*a*" preferably extends in a position radially more external than the maximum diameter of the disk part 9*a* of the core 9. It should be noted that, in FIG. 60, the top of the aforesaid portion 8*a*" appears at the same height as the upper surface of the disk part 9*a*, but for the purposes of an understanding of the present variant it may be assumed that—in the condition illustrated—the portion 8*a*" of the body 8 is already elastically compressed on account of the thrust exerted downwards on the sensor body 5, for example as a result of the abutment surfaces 24*a* present on the closing body 20 and/or of the stress exerted by the elastic contacts 7 (in the embodiment of FIG. 60, when elastic mounting is guaranteed by resting of the body 8 on the shielding element 4, the portion 8*a*" may in any case be prearranged in such a way that its top is flush with the upper surface of the disk part 9*a* of the core).

In the example, then, if the projecting portion 8*a*" is envisaged, its compression may be considered maximum, with the lower end of the portion 5*b* of the sensor body 5 that is then partially resting on the disk part 9*a* of the core 9. However, the degree of compression may be less than what is exemplified, with the upper surface of the portion 8*a*" that extends further up than the upper surface of the exposed area of the disk part 9*a*, i.e., with a partial compression of the portion 8*a*".

It will be appreciated that, in addition and/or as an alternative, an elastic mounting may be obtained also by exploiting the part 8*b* of the elastically deformable body 8, in particular in view of the fact that on its upper area there may possibly rest the surface of transition between the two parts of different diameter of the cavity C of the sensor body: this transition surface is designated by $C_3$ only in FIG. 60; for such a case, the height of the body 8*b* and/or of the portion 5*b* of the sensor body 5 may be sized in such a way as to enable the aforesaid elastic mounting.

In any case, the risk of excessive insertion of the compensation element within the cavity C of the sensor body 5 is prevented by the abutment or stop surface provided by the exposed upper area of the disk part 9*a* of the core 9.

In various embodiments described previously, the compensation element 3 is configured for coupling with the sensor body 5 with elastic coupling of the compensation element within the axial cavity C. In other embodiments, however, in addition or as an alternative, elastic coupling may be provided at an outer profile of the sensor body 5, preferably the outer profile of its portion 5*b*.

Figure 61:
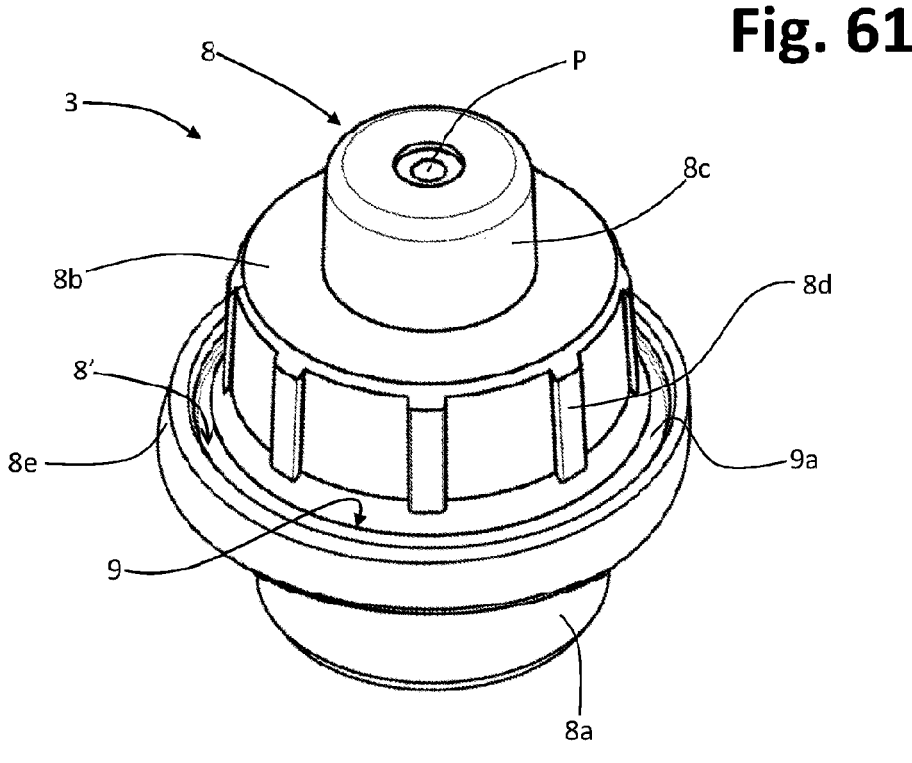
FIG. 61 is a perspective view of a compensation element of a sensor assembly according to possible embodiments.

With reference, for example, to FIG. 61, a compensation element 3 is for example illustrated, the elastically deformable body 8 of which—here configured as body overmoulded on the core 9—is built in a way substantially similar to what is illustrated in FIG. 60, but formed so as to comprise a peripheral part 8*c*, in particular having a generally cylindrical shape, which rises upwards from the body part 8*a*. The peripheral part 8*e* could, however, even have a shape different from a cylindrical wall, such as a shape at least in part complementary with a portion of the sensor body 5, in particular of the corresponding lower portion 5*b*. Preferably, the inner diameter or dimension of the peripheral part 8*e* is smaller than at least part of the outer diameter or dimension of the sensor body 5, i.e., of the corresponding lower portion 5*b*, in particular for the purpose of mutual fixing.

In this way, defined between the body part 8*b* and the inner surface of the wall that forms the body part 8*e* is a seat—designated by 8' in FIG. 61—for positioning and resting of the lower edge of the portion 5*b* of the sensor body 5.

As in the case of FIG. 60, then, the core 9 has a lateral dimension or maximum diameter smaller than the lateral dimension or maximum diameter of the elastically compressible body 8, and in particular of its body part 8*e*, with the disk part 9*a* of the core that is to a major extent embedded in the corresponding elastically deformable material. Also in embodiments of this type, it is in any case preferable for at least an area of the upper face of the disk part 9*a* to be exposed, so that at least a corresponding area of the lower end of the portion 5*b* of the sensor body 5 can bear thereupon in order to prevent the compensation element 3 from being fitted excessively on the sensor body 5, for example in order to prevent the part 8*c* of the elastically deformable body 8 from being inserted excessively within the cavity C of the sensor body 5, until it comes into contact with the membrane M.

It should be noted, however, that in a compensation element of this type it is not strictly indispensable for its parts to project within the cavity C of the sensor body 5, it being sufficient for the compensation element to be located in the proximity of said cavity.

This is particularly true, for example, when the sensor body 5 is as a whole very thin (in the direction of height) and hence also the corresponding cavity C is shallow; i.e., it has a volume that can be filled by the fluid that is so small as not to require the presence of a compensation element that projects within the cavity itself. In applications of this type, then, the compensation insert can extend completely or prevalently on the outside of the aforesaid cavity, the insert having the main function—in addition to guaranteeing elastic mounting of the assembly as already described above—of reducing the free volume that can be occupied by the fluid in the seat in which the assembly itself is installed, as well as compensating the possible increase in volume of the fluid following upon freezing.

Figure 62:
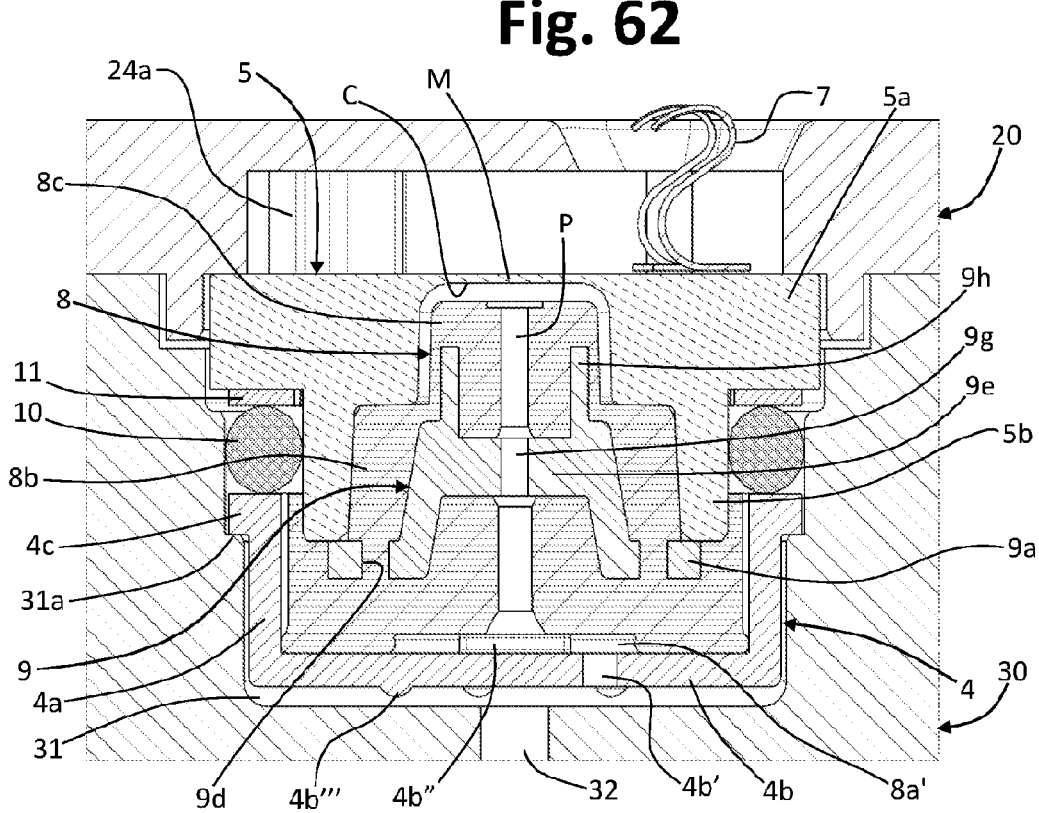
FIG. 62 is a partial cross-sectional view of a pressure-sensor device that uses a compensation element of the type illustrated in FIG. 61.

Visible in FIG. 62 is a device on which a sensor assembly including the compensation element 3 of FIG. 61 is mounted.

As may be noted, the body part 8*e* is fitted in an elastic way on the outer surface of the body portion 5*b*, with the lower end of the latter resting on the exposed surface of the disk part 9*a* of the core 9, which functions as end-of-travel in regard to insertion.

The elastic coupling between the body 5 and the body 8 is improved by the presence of the body part 8*e*, in a way similar to what has been described above: as has been said, however, in other embodiments the compensation element might not present parts projecting into the cavity of the sensor body.

What has been explained in relation to FIGS. 61-62, as regards the possibility of coupling in an elastic way the compensation element also, or exclusively, at an outer profile of the sensor body, i.e., on the outside of the corresponding cavity, may of course be applied also to all the other embodiments described herein or to sensors having a different shape.

From the foregoing description, the characteristics and advantages of the present invention emerge clearly, which are mainly represented by the case of production of the self-standing or independent sensor assembly described, which is fast, inexpensive, and precise. The sensor body 5 may be obtained with classic technologies employed in the sector of manufacture of pressure sensors. In a similar way, the compensation element is obtained with the use of moulding technologies and materials that are widely used and reliable. The fact that the compensation element can be elastically coupled in a well-defined and precise position to the pressure sensor enables, as explained, convenient handling of the components of the assembly as a single unit, in particular during movement on automatic assembly lines and/or during transport and/or warehousing. The fact that the hydraulic seal is provided via an annular element mounted on the outer periphery of the sensor body enables pre-mounting also of the component on the sensor assembly, to the further advantage in terms of handling, transport, and warehousing.

It is clear that, for the person skilled in the art, numerous variations are possible to the sensor assemblies and to the sensor devices described by way of example, without thereby departing from the scope of the invention. As mentioned, for the purposes of production of such further variants one or more of the characteristics described previously also with reference to different embodiments may be combined in any adequate way.

As per a known technique in the field, the passage P or P' of the compensation body 8 or 8₁ does not have to be necessarily configured as a duct that axially traverses the element itself, in so far as the passage for the fluid could be at least in part delimited between an outer surface profile of the body 8 itself and/or of the corresponding core 9, on the one hand, and a surface profile of the housing or seat 31, on the other. For instance, the compressible body 8 and/or the core 9 may have at least one surface groove that delimits, with a respective surface of the seat 31, at least part of a passage for the fluid, or conversely a surface of the seat 31 may have at least one surface groove that delimits a corresponding passage for the fluid with a respective outer surface of the body 8 and/or of the core 9, or else again both the compensation element 3 and the seat 31 may have respective grooves facing one another or coupled to form at least part of a passage for the fluid.

The passage for the fluid could be at least in part delimited between a surface profile of the elastically deformable body and a surface profile of the corresponding core.

The core of the compensation element could be provided in a number of parts, possibly driven into one another or engaged or welded together, between which there could be possibly be set at least a part of the corresponding elastically deformable body.

The elastically deformable body and the corresponding core could be configured to define a number of passages or a passage with parts staggered with respect to one another, for example as described in WO2017/182962, filed in the name of the present Applicant.

The invention claimed is:

1. A pressure-sensor assembly for detecting the pressure of a fluid, the sensor assembly being configured as a self-standing unit to be positioned within a corresponding housing, and comprising:

a pressure-sensitive component, having a generally cup-shaped sensor body, which includes a bottom portion and a peripheral portion that define an axial cavity, the bottom portion including an elastically deformable membrane part, which closes the axial cavity at an end of the sensor body, and the peripheral portion having a distal edge opposite to the bottom portion, which delimits an inlet of the axial cavity, the bottom portion having associated thereto at least one detection element for detecting deformation of the membrane part;

a compensation element, configured for compensating possible variations of volume of the fluid, comprising at least one compensation body, made of a first elastically deformable or compressible material, and a core, fixed on which is the at least one compensation body, the core being made of a second material stiffer than the first material, wherein the sensor body and the compensation element are configured as distinct parts, and at least one part of the compensation element extends within the axial cavity of the sensor body, wherein at least one first portion of the compensation element is configured for coupling with the sensor body in such a way that the pressure-sensitive component and the compensation element are manipulable as a single unit self-standing even in absence of said corresponding housing, and wherein the bottom portion and the peripheral portion of the sensor body have different outer diameters, there being fitted on the peripheral portion, which has a smaller diameter, at least one of an annular sealing element and a peripheral cylindrical part of the at least one first portion of the compensation element.

2. The pressure-sensor assembly according to claim 1, wherein the at least one first portion of the compensation element is configured for an interference coupling or an elastic coupling of the compensation element onto the sensor body, within the axial cavity and/or at an outer profile of the peripheral portion of the sensor body.

3. The pressure-sensor assembly according to claim 1, wherein the core of the compensation element has a respective portion that defines a reference surface for fitting the compensation element on the sensor body.

4. The pressure-sensor assembly according to claim 3, wherein the reference surface is an abutment surface or stop surface for said distal edge of the peripheral portion of the sensor body.

5. The pressure-sensor assembly according to claim 1, wherein the at least one first portion of the compensation element comprises an engagement part of the at least one compensation body having respective positioning and/or fixing means configured to interfere for coupling purposes with a peripheral surface of the sensor body.

6. The pressure-sensor assembly according to claim 1, wherein the at least one first portion of the compensation element comprises an engagement part of the core having respective positioning and/or fixing means configured to interfere for coupling purposes with a peripheral surface of the sensor body.

7. The pressure-sensor assembly according to claim 6, wherein the positioning and/or fixing means comprise a plurality of flexible axial appendages of the core which are distributed according to a peripheral wall of the at least one compensation body and configured to elastically interfere with a peripheral surface of the axial cavity of the sensor body.

8. The pressure-sensor assembly according to claim 1, wherein the sensor body has a plurality of axial recesses at an outer peripheral surface of the bottom portion, which has a greater diameter, and wherein at a transition between the bottom portion having the greater diameter and the peripheral portion having the smaller diameter a ring is arranged for possible resting thereon of the annular sealing element.

9. The pressure-sensor assembly according to claim 1, wherein the compensation element comprises a second portion designed to extend outside the axial cavity of the sensor body, in a position generally opposite to said first portion, the second portion including a respective part of the at least one compensation body and at least one respective part of the core.

10. The pressure-sensor assembly according to claim 9, further comprising a shielding element, including a peripheral wall and a bottom wall that define a respective cavity, in which said respective part of the at least one compensation body is at least partially inserted with an interference fit, the bottom wall of the shielding element including one or more through openings for the fluid.

11. The pressure-sensor assembly according to claim 1, wherein the core of the compensation element has a part which defines a resting surface for an annular elastic supporting element of the pressure-sensor assembly.

12. The pressure-sensor assembly according to claim 1, further comprising at least one elastic supporting element, configured for elastic mounting of the pressure-sensor assembly within said corresponding housing, the at least one elastic supporting element comprising at least one of:

an annular element designed for resting on a corresponding surface of the core of the compensation element that is generally opposite to said first portion, a part of the at least one compensation body designed to extend outside the axial cavity of the sensor body, in a position generally opposite to said first portion.

13. The pressure-sensor assembly according to claim 1, wherein the at least one compensation body comprises at least one of a body moulded over the core and a body elastically coupled on the core.

14. The pressure-sensor assembly according to claim 1, wherein the compensation element comprises at least one axial passage for the fluid.

15. The pressure-sensor assembly according to claim 1, wherein the core has a dimension of maximum lateral encumbrance or maximum diameter greater than a dimension of maximum lateral encumbrance or maximum diameter of the at least one compensation body.

16. A pressure-sensor assembly for detecting the pressure of a fluid, the sensor assembly being configured as a self-standing unit to be positioned within a corresponding housing, and comprising:

a pressure-sensitive component, having a generally cup-shaped sensor body, which includes a bottom portion and a peripheral portion that define an axial cavity, the bottom portion including an elastically deformable membrane part, which closes the axial cavity at an end of the sensor body, and the peripheral portion having a distal edge opposite to the bottom portion, which delimits an inlet of the axial cavity, the bottom portion having associated thereto at least one detection element for detecting deformation of the membrane part;

a compensation element, configured for compensating possible variations of volume of the fluid, comprising at least one compensation body, made of a first elastically deformable or compressible material, and a core, fixed on which is the at least one compensation body, the core being made of a second material stiffer than the first material, wherein the sensor body and the compensation element are configured as distinct parts, and at least one part of the compensation element extends within the axial cavity of the sensor body, wherein at least one first portion of the compensation element is configured for coupling with the sensor body in such a way that the pressure-sensitive component and the compensation element are manipulable as a single unit self-standing even in absence of said corresponding housing;

wherein the at least one first portion of the compensation element comprises an engagement part of the at least one compensation body having respective positioning and/or fixing means configured to interfere for coupling purposes with a peripheral surface of the sensor body;

wherein the positioning and/or fixing means comprise a plurality of axial reliefs which are distributed along a peripheral wall of said engagement part and configured to elastically interfere with a peripheral surface of the axial cavity of the sensor body.

\* \* \* \* \*